（12）United States Patent
Sharma

(10) Patent No.: US 10,564,517 B2
(45) Date of Patent: *Feb. 18, 2020

(54) CLOSED LOOP POSITION CONTROL FOR CAMERA ACTUATOR

(71) Applicant: Apple Inc., Cupertino, CA (US)

(72) Inventor: Shashank Sharma, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/415,887

(22) Filed: May 17, 2019

(65) Prior Publication Data

US 2019/0271901 A1  Sep. 5, 2019

Related U.S. Application Data

(63) Continuation of application No. 15/233,661, filed on Aug. 10, 2016, now Pat. No. 10,303,041.

(51) Int. Cl.
*G03B 13/36* (2006.01)
*G03B 5/02* (2006.01)
(Continued)

(52) U.S. Cl.
CPC ............... *G03B 13/36* (2013.01); *G02B 7/08* (2013.01); *G02B 27/646* (2013.01); *G03B 3/10* (2013.01);
(Continued)

(58) Field of Classification Search
CPC . H04N 5/23287; H04N 5/23212; G03B 13/36
See application file for complete search history.

(56) References Cited

U.S. PATENT DOCUMENTS 10,303,041 B2 * 5/2019 Sharma ................. G03B 13/36
2015/0146025 A1  5/2015 Bang et al.
(Continued)

FOREIGN PATENT DOCUMENTS

| WO | 2008041171 | 4/2008 |
| WO | 2016040353 | 4/2008 |
| WO | 2015045527 | 4/2015 |

OTHER PUBLICATIONS

International Search Report and Written Opinion from PCT/US2017/045747, dated Nov. 6, 2017, Apple Inc., pp. 1-11.

*Primary Examiner* — Christopher K Peterson
(74) *Attorney, Agent, or Firm* — Robert C. Kowert; Kowert, Hood, Munyon, Rankin & Goetzel, P.C.

(57) ABSTRACT

In some embodiments, a camera unit of a multifunction device may include an optical package and an actuator for moving the optical package. In some embodiments, the actuator may include an asymmetric magnet arrangement. The asymmetric magnet arrangement may include a lateral position control magnet situated at a first side of the optical package, and a pair of transverse position control magnets situated at respective second and third sides of the optical package opposite one another with respect to an axis between the optical package and the lateral magnet. In some embodiments, the actuator may include one or more position sensor magnets attached to the optical package, and one or more magnetic field sensors for determining a position of the position sensor magnets.

20 Claims, 12 Drawing Sheets

(51) Int. Cl.
  *G03B 3/10* (2006.01)
  *G02B 7/08* (2006.01)
  *H04N 5/232* (2006.01)
  *G02B 27/64* (2006.01)
  *H04N 5/225* (2006.01)

(52) U.S. Cl.
  CPC ........... *G03B 5/02* (2013.01); *H04N 5/23212* (2013.01); *H04N 5/23287* (2013.01); *G03B 2205/0015* (2013.01); *G03B 2205/0069* (2013.01)

(56) References Cited

U.S. PATENT DOCUMENTS

| | | |
|---|---|---|
| 2015/0296112 A1 | 10/2015 | Park et al. |
| 2016/0018624 A1 | 1/2016 | Yeo |
| 2016/0070270 A1 | 3/2016 | Beard et al. |
| 2016/0178869 A1 | 6/2016 | Shen |
| 2016/0231528 A1 | 8/2016 | Wong et al. |
| 2017/0139225 A1 | 5/2017 | Lim |

\* cited by examiner

CLOSED LOOP POSITION CONTROL FOR CAMERA ACTUATOR

This application is a continuation of U.S. patent application Ser. No. 15/223,661, filed Aug. 10, 2016, which is hereby incorporated by reference herein in its entirety.

BACKGROUND

Technical Field

This disclosure relates generally to position measurement and more specifically to position measurement for managing the motion of camera components.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis (referred to as the Z axis) of the camera to refocus the camera.

In addition, high image quality is easier to achieve in small form factor cameras if lens motion along the optical axis is accompanied by minimal parasitic motion in the other degrees of freedom, for example on the X and Y axes orthogonal to the optical (Z) axis of the camera. Thus, some small form factor cameras that include autofocus mechanisms may also incorporate optical image stabilization (OIS) mechanisms that may sense and react to external excitation/disturbance by adjusting location of the optical lens on the X and/or Y axis in an attempt to compensate for unwanted motion of the lens. In such systems, knowledge of the position of the lens is useful.

SUMMARY OF EMBODIMENTS

Some embodiments include a camera unit of a multifunction device. The camera unit may include an optical package and an actuator for moving the optical package. In some embodiments, the actuator may include an asymmetric magnet arrangement for actuation along an optical axis and/or along a plane that is orthogonal to the optical axis. The asymmetric magnet arrangement may include a lateral position control magnet and a pair of transverse position control magnets. The lateral position control magnet may be situated at a first side of the optical package. The pair of transverse position control magnets may be situated on respective second and third sides of the optical package opposite one another with respect to an axis between the optical package and the lateral position control magnet.

Furthermore, the actuator may include one or more position sensor magnets and one or more magnetic field sensors. The position sensor magnets may be attached to the optical package. The magnetic field sensors may be used to determine a position of at least one of the position sensor magnets. For instance, the optical package may include one or more lenses that define an optical axis, and a magnetic field sensor may be used to determine a position of a position sensor magnet along the optical axis.

Some embodiments include a magnetic actuator for moving an optical package. The magnetic actuator may include an asymmetric magnet arrangement for actuation along an optical axis of the optical package and/or along a plane that is orthogonal to the optical axis. The asymmetric magnet arrangement may include a lateral position control magnet, a first transverse position control magnet, and a second transverse position control magnet. The lateral position control magnet may be disposed proximate a first side of a moving member that is attached to the optical package. The first transverse position control magnet may be disposed proximate a second side of the moving member. The second transverse position control magnet may be disposed proximate a third side of the moving member. The third side may be opposite the second side with respect to an axis between the moving member and the lateral position control magnet.

Furthermore, the magnetic actuator may include one or more position sensor magnets and one or more magnetic field sensors for determining a position of the moving member. The position sensor magnets may be attached to the moving member. The magnetic field sensors may be used to determine a position of the moving member.

Some embodiments include a system having an optical package and an actuator for moving the optical package. The actuator may include an asymmetric magnet arrangement for actuation along an optical axis and/or along a plane that is orthogonal to the optical axis. The asymmetric magnet arrangement may include a lateral position control magnet and a pair of transverse position control magnets. The lateral position control magnet may be situated at a first side of the optical package. The pair of transverse position control magnets may be situated on respective second and third sides of the optical package opposite one another with respect to an axis between the optical package and the lateral position control magnet.

Furthermore, the actuator may include one or more position sensor magnets and one or more magnetic field sensors. The position sensor magnets may be attached to the optical package. The magnetic field sensors may be configured to measure one or more magnetic field components. For instance, at least one of the transverse position control magnets may contribute to a first magnetic field component corresponding to a first axis, and at least one of the position sensor magnets may contribute to a second magnetic field component corresponding to a second axis that is orthogonal to the first axis. In some embodiments, at least one of the magnetic field sensors may be configured to measure the first magnetic field component and the second magnetic field component.

In some embodiments, the system may include one or more processors and memory. The memory may include program instructions that, when executed by the processors, cause the processors to perform operations. In some implementations, the operations may include determining the first magnetic field component. For instance, the determination of the first magnetic field may be based at least in part on one or more measurements from a magnetic field sensor. Furthermore, the operations may include determining the second magnetic field component. For instance, the determination of the second magnetic field component may be based at least in part on one or more measurements from the magnetic field sensor. In various examples, the operations may include calculating a position of a position sensor magnet along an optical axis defined by one or more lenses of the optical package. For instance, the calculation of the position of the position sensor magnet along the optical axis may be based at least in part on the first magnetic field component and the second magnetic field component.

Some implementations include a method for determining a position of one or more camera components. The method may include generating a measurement of a magnetic field resulting at least in part from one or more position sensor magnets. For example, the measurement may be generated by using one or more magnetic field sensors to measure a magnetic field component created at least in part by one or more position sensor magnets that are fixedly mounted to a camera lens carrier. The camera lens carrier may be moveably coupled to a substrate. The magnetic field sensors may be fixedly mounted to the substrate. An autofocus actuator may provide motion of the camera lens carrier in a direction orthogonal to the substrate. In some implementations, the method may include calculating a position measurement for the lens carrier. For instance, position measurement for the lens carrier may be calculated based at least in part on the measurement of the magnetic field resulting from the position sensor magnets. Furthermore, the method may include adjusting a position of the camera lens carrier by altering a voltage and/or a current supplied to an autofocus coil of the autofocus actuator attached to the camera lens carrier. For example, the voltage and/or the current supplied to the autofocus coil may be altered based at least in part on position measurement calculated for the lens carrier.

Figure 1A:
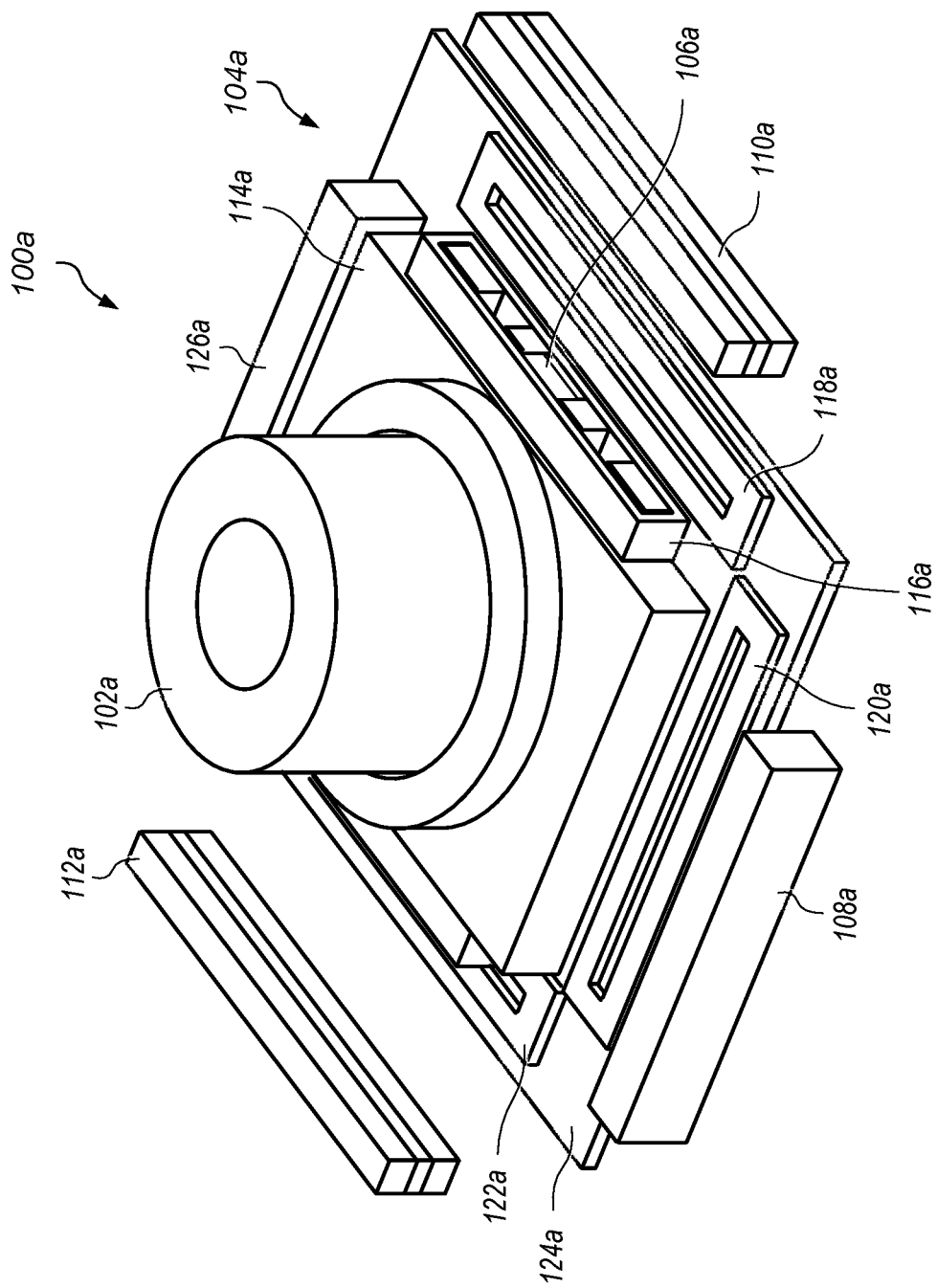
FIG. 1A illustrates an example embodiment of a camera having an actuator module or assembly that may, for example, be used to provide magnetic sensing for autofocus and/or optical image stabilization position detection in small form factor cameras, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Some embodiments include camera equipment outfitted with controls, magnets, and sensors to improve the position accuracy of a miniature actuation mechanism for a compact camera module. More specifically, in some embodiments, compact camera modules may include one or more actuators to deliver functions such as autofocus (AF) and optical image stabilization (OIS). One approach to delivering a very compact actuator for OIS is to use a Voice Coil Motor (VCM) arrangement including one or more AF coils, one or more OIS coils, and/or one or more magnets. As current is applied to the coils, the magnetic fields generated interact with the magnetic fields of the magnets to generate forces that move at least a portion of the actuator in a desired manner. One or more position sensor magnets may be attached to the moving portion (or moving body) of the actuator, and one or more magnetic field sensors (e.g., Hall sensors, tunneling magnetoresistance (TMR) sensor, giant magnetoresistance (GMR) sensor, etc.) may be used to determine a position of the position sensor magnets. As a position sensor magnet moves with the moving portion of the actuator, the magnetic field component(s) detected by the magnetic field sensor may change, which in turn may alter the voltage across sense terminals of the magnetic field sensor.

Some embodiments may allow the magnetic field sensor output voltage to be very well correlated to the position of the moving body of the actuator, such that the sensor output can be used as a measure of position, and be used to feedback the position, and allow more accurate positioning. Using a VCM, in some embodiments the forces generated may be substantially linear with applied current. Furthermore, the position of the moving body may be substantially proportional to the current applied to the coils.

In some embodiments, a camera unit of a multifunction device may include an optical package and an actuator for moving the optical package. The actuator may include an asymmetric magnet arrangement for actuation along an optical axis and/or along a plane that is orthogonal to the optical axis. The asymmetric magnet arrangement may include a lateral position control magnet and a pair of transverse position control magnets. The lateral position control magnet may be situated at a first side of the optical package. The pair of transverse position control magnets may be situated on respective second and third sides of the optical package opposite one another with respect to an axis between the optical package and the lateral position control magnet. In some embodiments, the asymmetric magnet arrangement may allow for the camera unit to be located adjacent, or proximate to, another camera unit such as to reduce or eliminate interference between the magnetic fields of the adjacent camera units. In some examples, the camera unit may be a first camera unit that is disposed adjacent, or proximate to, a second camera unit that has a symmetric magnet arrangement.

Furthermore, the actuator may include one or more position sensor magnets and one or more magnetic field sensors. The position sensor magnets may be attached to the optical package. The magnetic field sensors may be used to determine a position of at least one of the position sensor magnets. For instance, the optical package may include one or more lenses that define an optical axis, and a magnetic field sensor may be used to determine a position of a position sensor magnet along the optical axis. In some embodiments, the magnetic field sensors may include one or more Hall sensors, one or more TMR sensors, and/or one or more GMR sensors.

In some examples, at least one of the transverse position control magnets may contribute to a first magnetic field component corresponding to a first axis, and at least one of the position sensor magnets may contribute to a second magnetic field component corresponding to a second axis. For instance, the second axis may be orthogonal to the first axis. Furthermore, at least one of the magnetic field sensors may be configured to measure at least one of the first magnetic field component and the second magnetic field component. For example, the magnetic field sensors may be configured to measure both the first magnetic field component and the second magnetic field component for determination of an angle between the first magnetic field component and the second magnetic field component. In some examples, the angle between the first magnetic field component and the second magnetic field component may be an angle of the resultant magnetic flux density vector that is based on a first magnetic flux density vector corresponding to the first magnetic field component and a second magnetic flux density vector corresponding to the second magnetic field component.

According to some examples, a pair of position sensor magnets may be oriented with magnetic fields transverse to magnetic fields of the pair of transverse position control magnets. For instance, the pair of position sensor magnets may be situated on the respective second and third sides of the optical package opposite one another with respect to the axis between the optical package and the lateral position control magnet. Additionally or alternatively, a pair of position sensor magnets may be oriented with magnetic fields having polarity alignments that are parallel and/or antiparallel to polarity alignments of magnetic fields of the pair of transverse position control magnets. In some examples, the pair of position sensor magnets may be situated on the first side and a fourth side of the optical package. The fourth side of the optical package may be opposite the first side along the axis between the optical package and the lateral position control magnet.

In some examples, a non-magnetic dummy mass may be situated at the fourth side of the optical package. Furthermore, in some embodiments, there may be no magnets situated at the fourth side of the optical package. For instance, there may be no lateral position control magnets or transverse position control magnets situated at the fourth side of the optical package.

In some embodiments, an actuator for moving an optical package may include an asymmetric magnet arrangement for actuation along an optical axis and/or along a plane that is orthogonal to the optical axis. The asymmetric magnet arrangement may include a lateral position control magnet, a first transverse position control magnet, and a second transverse position control magnet. The lateral position control magnet may be disposed proximate a first side of a moving member that is attached to the optical package. The first transverse position control magnet may be disposed proximate a second side of the moving member. The second transverse position control magnet may be disposed proximate a third side of the moving member. The third side may be opposite the second side with respect to an axis between the moving member and the lateral position control magnet.

Furthermore, the magnetic actuator may include one or more position sensor magnets and one or more magnetic field sensors for determining a position of the moving member. The position sensor magnets may be attached to the moving member. In various embodiments, the optical package may include one or more lenses that define an optical axis, and at least one of the magnetic field sensors may be configured to measure at least one magnetic field component for determination of a position of the moving member with respect to the optical axis. The magnetic field sensors may include, for example, a Hall sensor, a TMR sensor, and/or a GMR sensor. In some embodiments, the magnetic field sensors may include at least one Hall sensor and at least one of a TMR sensor or a GMR sensor.

In some examples, the optical package may be attached to a top side of the moving member, and the magnetic field sensors may be attached to a base disposed proximate a bottom side of the moving member. The bottom side of the moving member may be opposite the top side of the moving member. The magnetic actuator may be configured to move the moving member relative to the base.

In some examples, the first transverse position control magnet may contribute to a first magnetic field component corresponding to a first axis, and at least one of the position sensor magnets may contribute to a second magnetic field component corresponding to a second axis. For instance, the second axis may be orthogonal to the first axis. Furthermore, at least one of the magnetic field sensors may be configured to measure the first magnetic field component and/or the second magnetic field component.

In some embodiments, the position sensor magnets may include a first position sensor magnet and a second position sensor magnet. The first position sensor magnet may be oriented with a first magnetic field along a first direction. The second position sensor magnet may be oriented with a second magnetic field along a second direction. In some examples, the second direction may be antiparallel to the first direction. In other embodiments, the second direction may be parallel to the first direction.

In some embodiments, the magnetic field sensors may include a first magnet field sensor and a second magnetic field sensor. For instance, the first magnetic field sensor may be disposed proximate the second side of the moving member, and the second magnetic field member may be disposed proximate the third side of the moving member.

According to some embodiments, the magnetic actuator may include one or more autofocus coils that are attached to the moving member. In some embodiments, the magnetic actuator may include two autofocus coils attached to the moving member. A first autofocus coil may be disposed proximate the first transverse position control magnet and/or proximate the second side of the moving member. Likewise, a second autofocus coil may be disposed proximate the second transverse position control magnet and/or proximate the third side of the moving member. Other embodiments, however, may include fewer or more autofocus coils. Furthermore, the autofocus coils may be positioned differently in other embodiments.

In some examples, at least one autofocus coil may define a central space that is encircled by the autofocus coil. One or more position sensor magnets may be disposed (or nested) within the central space encircled by the autofocus coil. In some embodiments, a support structure may be disposed within the autofocus coil. In such embodiments, one or more position sensor magnets may be attached to the support structure. The support structure may be configured to support the position sensor magnet(s) within the central space encircled by the autofocus coil such that the position sensor magnet(s) move along with the autofocus coil and the moving member.

In some embodiments, the magnetic actuator may include optical image stabilization coils. The optical image stabilization coils may disposed proximate, or attached to, the base. In some examples, the magnetic actuator may include three optical image stabilization coils. For instance, a first optical image stabilization coil may be disposed on the base and proximate the first side of the moving member. A second optical image stabilization coil may be disposed on the base and proximate the second side of the moving member. A third optical image stabilization coil may be disposed on the base and proximate the third side of the moving member. Other examples, however, may include fewer or more optical image stabilization coils. Moreover, the optical image stabilization coils may be positioned differently in other embodiments.

In some embodiments, a system may include an optical package and an actuator for moving the optical package. The actuator may include an asymmetric magnet arrangement for actuation along an optical axis and/or along a plane that is orthogonal to the optical axis. The asymmetric magnet arrangement may include a lateral position control magnet and a pair of transverse position control magnets. The lateral position control magnet may be situated at a first side of the optical package. The pair of transverse position control magnets may be situated on respective second and third sides of the optical package opposite one another with respect to an axis between the optical package and the lateral position control magnet.

Furthermore, the actuator may include one or more position sensor magnets and one or more magnetic field sensors. The position sensor magnets may be attached to the optical package. The magnetic field sensors may be configured to measure one or more magnetic field components. For instance, at least one of the transverse position control magnets may contribute to a first magnetic field component corresponding to a first axis, and at least one of the position sensor magnets may contribute to a second magnetic field component corresponding to a second axis that is orthogonal to the first axis. In some embodiments, at least one of the magnetic field sensors may be configured to measure the first magnetic field component and the second magnetic field component.

In some embodiments, the position sensor magnets may include a first position sensor magnet and a second position sensor magnet. Furthermore, the magnetic field sensors may include a first magnetic field sensor and a second magnetic field sensor. The first position sensor magnet may be oriented with a first magnetic field along a first direction. The first magnetic field sensor may be oriented to measure one or more magnetic field components of the first magnetic field of the first position sensor magnet. The second position sensor magnet may be oriented with a second magnetic field along a second direction. In some examples, the second direction may be antiparallel to the first direction. In other embodiments, the second direction may be parallel to the first direction. The second magnetic field sensor may be oriented to measure one or more magnetic field components of the second magnetic field of the second position sensor magnet.

In some embodiments, the system may include one or more processors and memory. The memory may include program instructions that, when executed by the processors, cause the processors to perform operations. In some implementations, the operations may include determining the first magnetic field component. For instance, the determination of the first magnetic field may be based at least in part on one or more measurements from a magnetic field sensor. Furthermore, the operations may include determining the second magnetic field component. For instance, the determination of the second magnetic field component may be based at least in part on one or more measurements from the magnetic field sensor. In various examples, the operations may include calculating a first position of a position sensor magnet along an optical axis defined by one or more lenses of the optical package. For instance, the calculation of the first position of the position sensor magnet along the optical axis may be based at least in part on the first magnetic field component and the second magnetic field component.

In some embodiments, the actuator may include one or more autofocus coils. The memory may include program instructions that, when executed by the processors, cause the processors to determine, based at least in part on the first position, an adjustment to at least one of a voltage or a current supplied to an autofocus coil. Such an adjustment may cause a position sensor magnet that is attached to the autofocus coil to move to a second position, along the optical axis, that is different than the first position.

Some embodiments include a method for determining a position of one or more camera components. The method may include generating a measurement of a magnetic field resulting at least in part from one or more position sensor magnets. For example, the measurement may be generated by using one or more magnetic field sensors to measure a magnetic field component created at least in part by one or more position sensor magnets that are fixedly mounted to a camera lens carrier. The camera lens carrier may be moveably coupled to a substrate. The magnetic field sensors may be fixedly mounted to the substrate. An autofocus actuator may provide motion of the camera lens carrier in a direction orthogonal to the substrate. In some implementations, the method may include calculating a position measurement for the lens carrier. For instance, position measurement for the lens carrier may be calculated based at least in part on the measurement of the magnetic field resulting from the position sensor magnets. Furthermore, the method may include adjusting a position of the camera lens carrier by altering a voltage and/or a current supplied to an autofocus coil of the autofocus actuator attached to the camera lens carrier. For example, the voltage and/or the current supplied to the autofocus coil may be altered based at least in part on position measurement calculated for the lens carrier.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIGS. 1A-2I illustrate embodiments of an example actuator module or assembly in which embodiments as described herein may be applied. As one of skill in the art will readily ascertain in light of having read the included disclosure, a wide variety of configurations of position sensors and magnets fulfill differing design goals in different embodiments without departing from the scope and intent of the present disclosure. As one of skill in the art will readily ascertain in light of having read the included disclosure, a wide variety of actuator configurations fulfill differing design goals in different embodiments without departing from the scope and intent of the present disclosure. For example, while the embodiments shown herein reflect voice coil motor actuators, one of skill in the art will readily understand that different actuators, including non-magnetic motorized actuators such as rotary motors or piezo-electric actuators, can be used with embodiments without departing from the scope and intent of the present disclosure.

FIG. 1A illustrates an example embodiment of a camera module 100a having an actuator module or assembly that may, for example, be used to provide magnetic sensing for autofocus and/or optical image stabilization position detection in small form factor cameras, according to at least some embodiments. The camera module 100a may include an optical package (e.g., including a tele-lens) 102a and an actuator 104a for moving the optical package 102a. In some embodiments, a plurality of position sensor magnets 106a may be attached to the optical package 102a. In various embodiments, the actuator 104a may include an asymmetric magnet arrangement for actuation along an optical axis and/or along a plane that is orthogonal to the optical axis. The asymmetric magnet arrangement may include a lateral position control magnet 108a and a pair of transverse position control magnets 110a and 112a. The lateral position control magnet 108a may be situated at a first side of the optical package 102a. The pair of transverse position control magnets 110a and 112a may be situated on respective second and third sides of the optical package 102a. The pair of transverse position control magnets 110a and 112a may be opposite one another with respect to an axis between the optical package 102a and the lateral position control magnet 108a. The first side may be a side of the optical package 102a at which no transverse position control magnets are present. In some embodiments, the camera module 100a may include one or more magnetic field sensors (obscured by coils in FIG. 1A but visible in FIGS. 2A-2I) configured to measure one or more magnetic field components to enable determination of a position of the position sensor magnets 106a.

A lens carrier 114a may allow mounting of autofocus coils 116a and other components of an autofocus system to the optical package 102a. The actuator 104a may include optical image stabilization components such as, but not limited to, optical image stabilization coils 118a, 120a, and 122a mounted to an actuator base 124a. In some embodiments, the transverse position control magnets 110a and 112a (e.g., dual-pole magnets) may include a pair of magnets with differing dominant magnetic field orientations (e.g., antiparallel), whereas the lateral position control magnet 108a (e.g., a single-pole magnet) may have only a single dominant magnetic field orientation.

In some embodiments, no actuator lateral magnet is situated on a remaining side of the optical package (occupied in FIG. 1A by dummy mass 126a) at which neither the lateral position control magnet 108a nor the transverse position control magnets 110a and 112a are situated.

In some embodiments, a non-magnetic dummy mass 126a is situated on a remaining side of the optical package at which neither the lateral position control magnet 108a nor the transverse position control magnets 110a and 112a are situated.

Figure 1B:
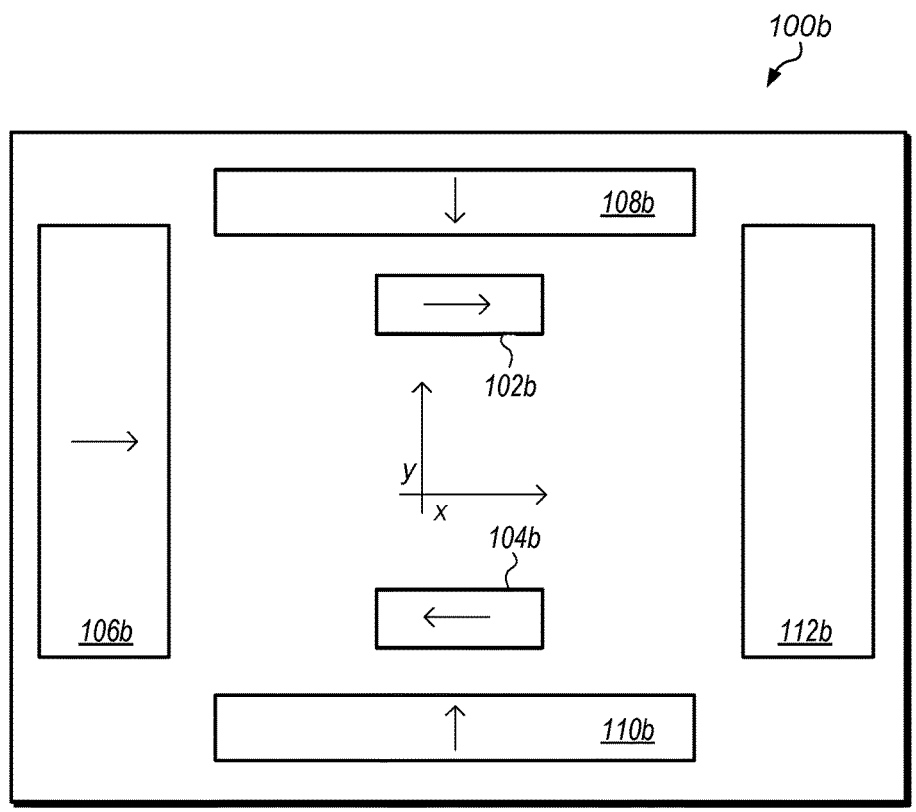
FIG. 1B depicts an example embodiment of an actuator module or assembly that may, for example, be used to provide magnetic sensing for autofocus and/or optical image stabilization position detection in small form factor cameras, according to at least some embodiments.

FIG. 1B depicts an example embodiment of an actuator 300b module or assembly that may, for example, be used to provide magnetic sensing for autofocus and/or optical image stabilization position detection in small form factor cameras, according to at least some embodiments. In some embodiments, the actuator 100b may include a plurality of position sensor magnets 102b and 104b. A lateral position control magnet 106b may be situated at a first side (e.g., of the optical package, which is not shown in FIG. 1B), and a pair of transverse position control magnets 108b and 110b may be situated on respective second and third sides of the optical package opposite one another with respect to an axis between the optical package and the lateral position control magnet 106b. The first side may be a side of the optical package at which no transverse position control magnets are present. In some embodiments, one or more magnetic field sensors (not shown in FIG. 1B but visible in FIGS. 2A-2I) may be included for determining a position of the position sensor magnets 102b and 104b.

In some embodiments, no actuator magnets are situated on a remaining side of the optical package (e.g., the side occupied by dummy mass 112b in FIG. 1B) at which neither the lateral position control magnet 106b nor the transverse position control magnets 108b and 110b (with the direction of their upper magnets indicated) are situated.

In some embodiments, the plurality of position sensor magnets 102b and 104b may include a pair of magnets 102b and 104b oriented with magnetic fields transverse to the magnetic fields of the pair of transverse position control magnets 108b and 110b. The plurality of position sensor magnets 102b and 104b may include a pair of magnets 102b and 104b situated on the respective second and third sides of the optical package opposite one another with respect to the axis between the optical package and the lateral position control magnet 106b.

Figure 1C:
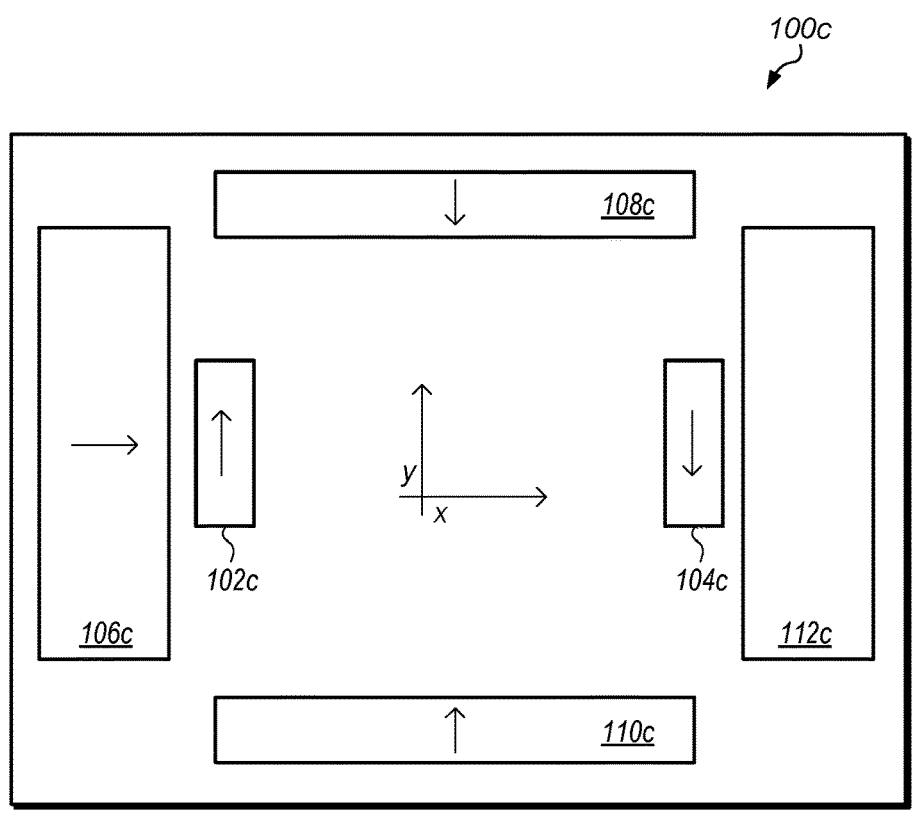
FIG. 1C illustrates an example embodiment of an actuator module or assembly that may, for example, be used to provide magnetic sensing for autofocus and/or optical image stabilization position detection in small form factor cameras, according to at least some embodiments.

FIG. 1C illustrates an example embodiment of an actuator 100c module or assembly that may, for example, be used to provide magnetic sensing for autofocus and/or optical image stabilization position detection in small form factor cameras, according to at least some embodiments. In some embodiments, the actuator 100c may include a plurality of position sensor magnets 102c and 104c. A lateral position control magnet 106c may be situated at a first side (e.g., of the optical package, which is not shown in FIG. 1C). Furthermore, a pair of transverse position control magnets 108c and 110c may be situated on respective second and third sides of the optical package opposite one another with respect to an axis between the optical package and the lateral position control magnet 106c. The first side may be a side of the optical package at which no transverse position control magnets are present. In some embodiments, one or more magnetic field sensors (not shown in FIG. 1C but visible in FIGS. 2A-2I) are included for determining a position of the position sensor magnets 102c and 104c.

In some embodiments, no actuator magnets are situated on a remaining side of the optical package (e.g., the side occupied by dummy mass 112c in FIG. 1C) at which neither the lateral position control magnet 106c nor the transverse position control magnets 108c and 110c are situated.

In some embodiments, the plurality of position sensor magnets 102c and 104c may include a pair of magnets 102c and 104c oriented with magnetic fields parallel and antiparallel to the magnetic fields of the pair of transverse position control magnets 108c and 110c. The plurality of position sensor magnets 102c and 104c may include a pair of magnets 102c and 104c situated on the respective first and fourth sides (e.g., the sides occupied by the lateral position control magnet 106c and the dummy mass 112c) of the optical package opposite one another with respect to an axis between the optical package and the actuator transverse position control magnets 108c and 110c.

Figure 2A:
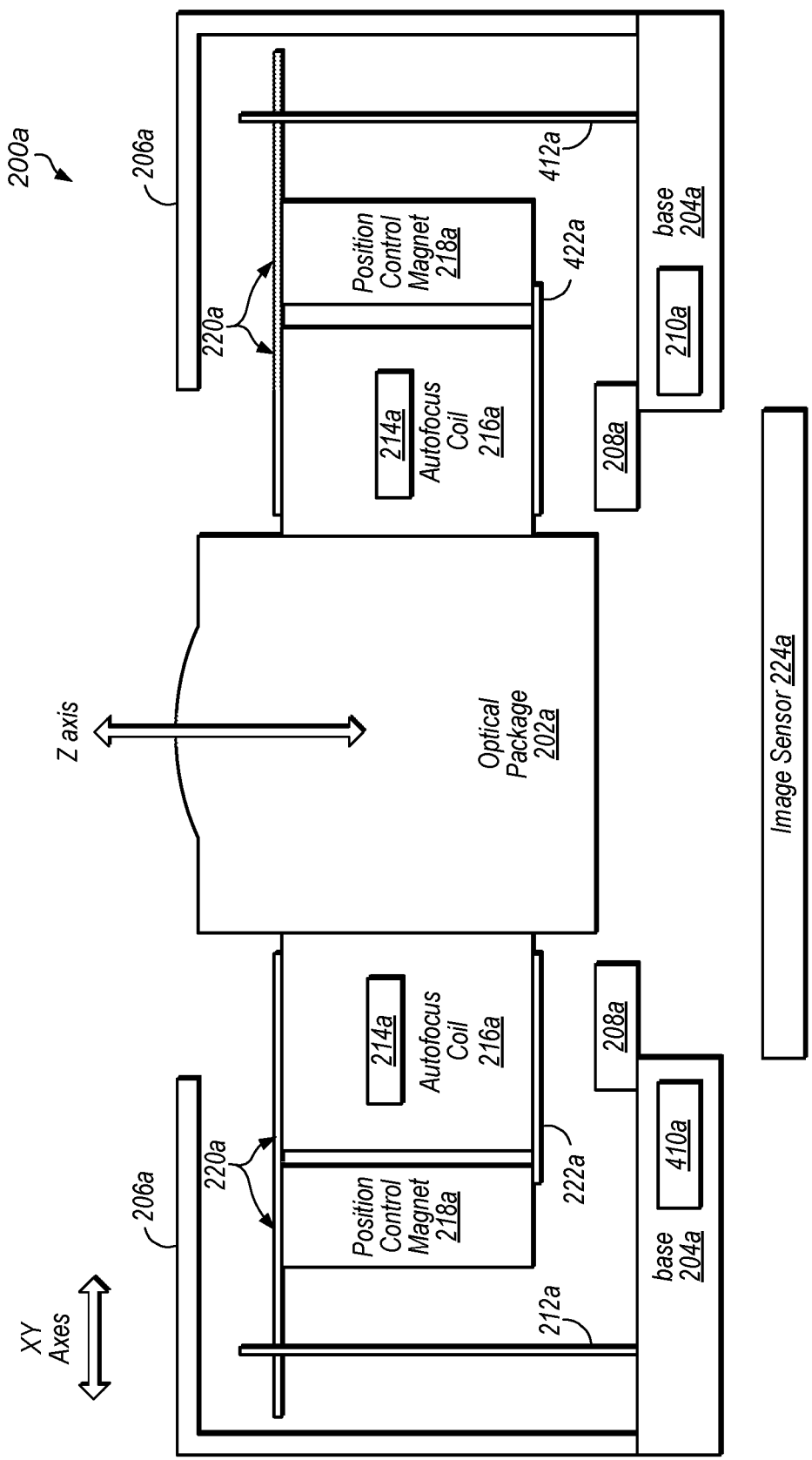
FIG. 2A depicts a side view of an example embodiment of an actuator module or assembly that may, for example, be used to provide magnetic sensing for autofocus and/or optical image stabilization position detection in small form factor cameras, according to at least some embodiments.

FIG. 2A depicts a side view of an example embodiment of a camera module having an actuator 200a module or assembly that may, for example, be used to move an optical package 202a and provide magnetic sensing for autofocus and/or optical image stabilization position detection in small form factor cameras, according to at least some embodiments. As shown in FIG. 2A, the actuator 200a may include a base or substrate 204a and a cover 206a. The base 204a may include and/or support one or more position sensors (e.g., Hall sensors, TMR sensors, GMR sensors, etc.) 208a, one or more optical image stabilization coils 210a, and one or more suspension wires 212a, which may at least partly enable magnetic sensing for autofocus and/or optical image stabilization position detection, e.g., by detecting movements of position sensor magnets 214a.

In some embodiments, the actuator 200a may include one or more autofocus coils 216a and one or more position control magnets 218a, which may at least partly enable autofocus functionality such as moving the optical package 202a along the Z axis and/or along an optical axis defined by one or more lenses of the optical package 202a. In some examples, at least one position sensor magnet 214a may be disposed proximate to at least one autofocus coil 216a. In some embodiments, at least one position sensor magnet 214a may be coupled to at least one autofocus coil 216a. For instance, the autofocus coils 216a may each define a central space that is encircled by the respective autofocus coil 216a. The position sensor magnets 214a may be disposed within the central spaces encircled by the autofocus coils 216a. Additionally or alternatively, the position sensor magnets 214a may be attached to support structures (not shown) that are fixed to the autofocus coils 216a. For example, a support structure, to which a position sensor magnet 214a is attached, may be disposed within a central space encircled by an autofocus coil 216a and the support structure may be fixed to the autofocus coil 216. In various embodiments, the actuator 200a may include two position control magnets 218, two autofocus coils 216a, and two position sensor magnets 214a, e.g., as illustrated in FIG. 4A. However, in other embodiments, the actuator 200a may include fewer or more position control magnets 218a, autofocus coils 216a, and/or position sensor magnets 214a.

In some embodiments, the actuator 200a may include four suspension wires 212a. The optical package 202a may be suspended with respect to the base 204a by suspending one or more upper springs 220a on the suspension wires 212a. In some embodiments, the actuator may include one or more lower springs 222a. The upper spring(s) 220a and lower spring(s) 222a may be collectively referred to herein as optics springs. In the optical package 202a, an optics component (e.g., one or more lens elements, a lens assembly, etc.) may be screwed, mounted or otherwise held in or by an optics holder. Note that upper spring(s) 220a and lower spring(s) 222a may be flexible to allow the optical package 202a a range of motion along the Z (optical) axis for optical focusing, and suspension wires 212a may be flexible to allow a range of motion on the X-Y plane orthogonal to the optical axis for optical image stabilization. Also note that, while embodiments show the optical package 202a suspended on wires 212a, other mechanisms may be used to suspend the optical package 202a in other embodiments.

In various embodiments, the camera module may include an image sensor 224a. The image sensor may be disposed below the optical package 202a such that light rays may pass through one or more lens elements of the optical package 202a (e.g., via an aperture at the top of the optical package 202a) and to the image sensor 224a.

Figure 2B:
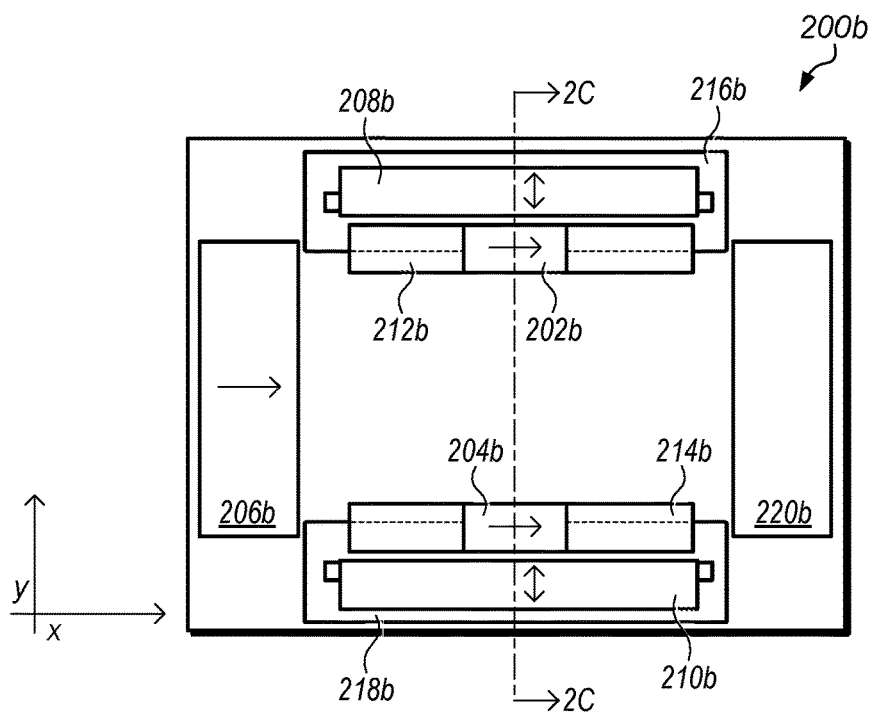
FIG. 2B illustrates a top view of an example embodiment of an actuator module or assembly that may, for example, be used to provide magnetic sensing for autofocus and/or optical image stabilization position detection in small form factor cameras, according to at least some embodiments.

FIG. 2B illustrates a top view of an example embodiment of an actuator 200b module or assembly that may, for example, be used to provide magnetic sensing for autofocus and/or optical image stabilization position detection in small form factor cameras, according to at least some embodiments. In some embodiments, the actuator 200b may include a plurality of position sensor magnets 202b and 204b. Furthermore, the actuator 200b may have an asymmetric magnet arrangement that includes a lateral position control magnet 206b and a pair of transverse position control magnets 208b and 210b. The lateral position control magnet 206b may be situated at a first side (e.g., of the optical package, which is not shown in FIG. 2B). The pair of transverse position control magnets 208b and 210b may be situated on respective second and third sides of the optical package opposite one another with respect to an axis between the optical package and the lateral position control magnet 206b. The first side may be a side of the optical package at which no transverse position control magnets are present. In some embodiments, one or more magnetic field sensors (not shown in FIG. 2B but visible in FIG. 2C) are included for determining a position of the position sensor magnets 202b and 204b. In some embodiments, the actuator 200b may include one or more coils that provide autofocus and/or optical image stabilization functionality. For example, the actuator 200b may include autofocus coils 212b and 214b, as well as optical image stabilization coils 216b and 218b. Although not shown in FIG. 2B, the actuator 200b may include another optical image stabilization coil situated at the first side, e.g., beneath the lateral position control magnet 206b.

In some embodiments, no actuator magnets are situated on a remaining side of the optical package (e.g., the side occupied by dummy mass 220c in FIG. 2B) at which neither the lateral position control magnet 206b nor the transverse position control magnets 208b and 210b are situated.

In some embodiments, the plurality of position sensor magnets 202b and 204b may include a pair of magnets 202b and 204b oriented with magnetic fields transverse to the magnetic fields of the pair of transverse position control magnets 208b and 210b. Furthermore, the plurality of position sensor magnets 202b and 204b may include a pair of magnets 202b and 204b situated on the respective second and third sides of the optical package opposite one another with respect to the axis between the optical package and the lateral position control magnet 206b.

Figure 2C:
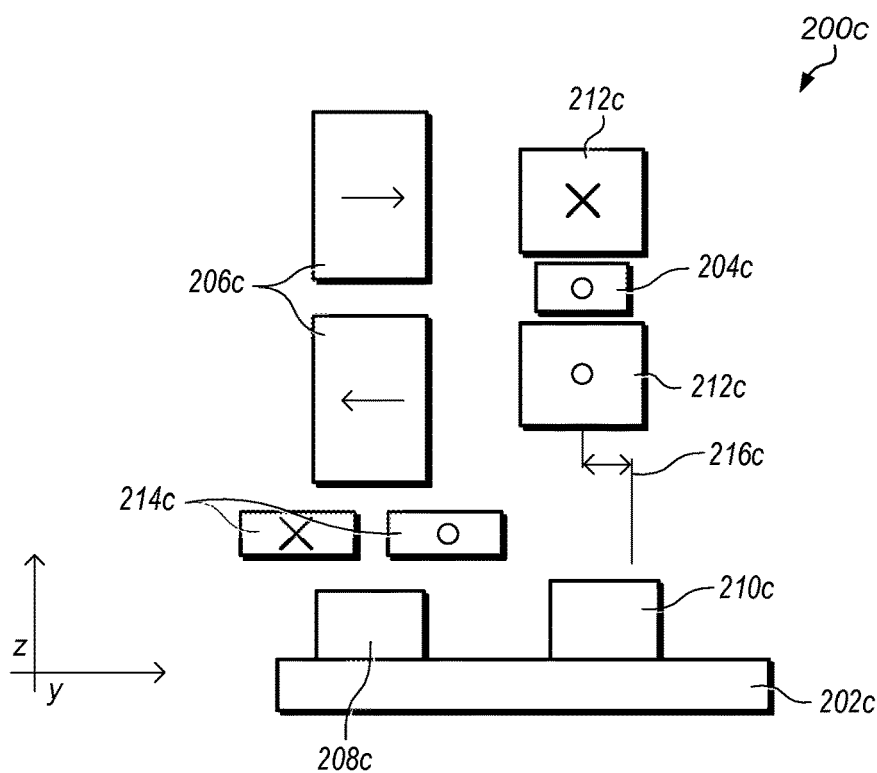
FIG. 2C depicts a side view of an example embodiment of an actuator module or assembly that may, for example, be used to provide magnetic sensing for autofocus and/or optical image stabilization position detection in small form factor cameras, according to at least some embodiments.

FIG. 2C depicts a side view of an example embodiment of an actuator 200c module or assembly that may, for example, be used to provide magnetic sensing for autofocus and/or optical image stabilization position detection in small form factor cameras, according to at least some embodiments. In some examples, FIG. 2C may depict a cross sectional view of the actuator 200b as indicated by the cross section line 2C-2C in FIG. 2B. In some embodiments, the actuator 200c may include an actuator base 202c, one or multiple position sensor magnets (e.g., position sensor magnet 204c), and one or multiple position control magnets (e.g., transverse position control magnet 206c). In some embodiments, the actuator 200c may include one or more magnetic field sensors such as a Hall sensor 208c and/or a tunneling magnetoresistance (TMR)/giant magnetoresistance (GMR) sensor 210c. Furthermore, in some embodiments, the actuator 200c may include one or more coils. For example, the actuator 200c may include one or more autofocus coils 212c and/or one or more optical image stabilization coils 214c. In some embodiments, a lateral offset 216c may be provided between the position sensor magnet 204c and the TMR/GMR sensor 210c.

The magnetic field sensors may be used for determining a position of the position sensor magnets. For instance, the actuator 200c may include a Hall sensor 208c and a TMR/GMR sensor 210c. In some examples, the Hall sensor 208c may be used for determining a position of the position sensor magnet 204c along the X-Y plane for optical image stabilization purposes. Furthermore, in some examples, the TMR/GMR sensor 210c may be used for determining a position of the position sensor magnet 204c along the Z axis for autofocus purposes. The position of the position sensor magnet 204c along the X-Y plane and/or along the Z axis may be used for determining a position of the optical package and/or one or more components of the optical package. In various examples, such position information may be used for providing closed loop position control along the X, Y, and/or Z axes.

In some embodiments, a magnetic field sensor (e.g., TMR/GMR sensor 210c) may be disposed and/or oriented such that it is capable of measuring one or more magnetic field components. For instance, the magnetic field sensor may be configured to measure one or more magnetic field components that individually correspond to an axis (e.g., X, Y, and Z axes). In some examples, the transverse position control magnet 206c may contribute to a first magnetic field component corresponding to a first axis. The position sensor magnet 204c may contribute to a second magnetic field component corresponding to a second axis that is different than the first axis. For instance, the second axis may be orthogonal to the first axis. The magnetic field sensor may be configured to measure the first magnetic field component and the second magnetic field component. As the position sensor magnet 204c moves (e.g., along the Z axis for autofocus purposes), the magnitude of its contribution to the second magnetic field component may change. The magnetic field sensors measurements of the first magnetic field component and the second magnetic field component may be used to calculate an angle between the first magnetic field component and the second magnetic field component. The angle between the first magnetic field component and the second magnetic field component may correlate with a position of the position sensor magnet 204c. For instance, by simulating performance of the actuator 200c, or by testing the actual actuator 200c, multiple measurements may be obtained that may be used to characterize the behavior of the actuator 200c with respect to an angle (e.g., between the first magnetic field component and the second magnetic field component) and position (e.g., of the position sensor magnet 204c along the Z axis). In some instances, the simulation and/or testing measurements may be used to characterize the behavior of the actuator 200c to correlate changes in the angle (e.g., between the first magnetic field component and the second magnetic field component) with changes in the position. For instance, the change in the angle between the first magnetic field component and the second magnetic field component may be correlated with a particular autofocus stroke. In some embodiments, changes in the position of position sensor magnet 204c along the X-Y plane may also be taken into consideration in characterizing the behavior of the actuator 200c. Once the behavior of the actuator 200c is characterized, the resulting correlations may be used as a map for determining the position of the position sensor magnet 204c along the X, Y, and/or Z axes.

Figure 2D:
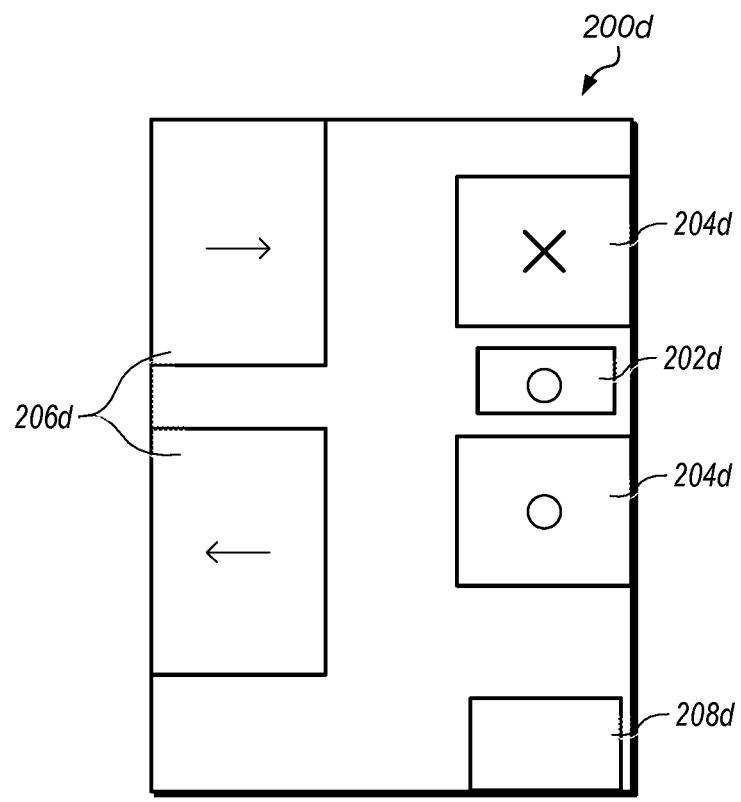
FIG. 2D illustrates a side view of an example embodiment of an actuator module or assembly that may, for example, be used to provide magnetic sensing for autofocus and/or optical image stabilization position detection in small form factor cameras, according to at least some embodiments.

FIG. 2D illustrates a side view of an example embodiment of an actuator 200d module or assembly that may, for example, be used to provide magnetic sensing for autofocus position detection in small form factor cameras, according to at least some embodiments. In some embodiments, the actuator 200d may include a plurality of position sensor magnets, for example position sensor magnet 202d nested between autofocus coils 204d. A transverse position control magnet 206d (e.g., a dual pole magnet) may be situated in the actuator 200d. In some embodiments, the actuator 200d may include one or more magnetic field sensors 208d (e.g., a Hall sensor, a TMR sensor, and/or a GMR sensor) for determining a position of the position sensor magnet 202d. In some embodiments, no lateral offset is provided between position sensor magnet 202d and the magnetic field sensor 208d.

Figure 2E:
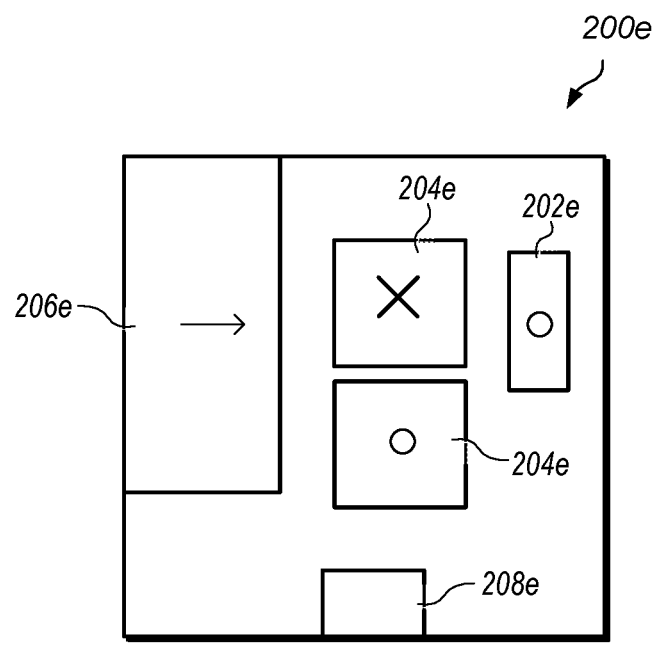
FIG. 2E depicts a side view of an example embodiment of an actuator module or assembly that may, for example, be used to provide magnetic sensing for autofocus and/or optical image stabilization position detection in small form factor cameras, according to at least some embodiments.

FIG. 2E depicts a side view of an example embodiment of an actuator 200e module or assembly that may, for example, be used to provide magnetic sensing for autofocus position detection in small form factor cameras, according to at least some embodiments. In some embodiments, the actuator 200e may include a plurality of position sensor magnets, for example position sensor magnet 202e mounted between an autofocus coil 204e and an optical package (not shown). A transverse position control magnet 206e may be situated in the actuator 200e. In FIG. 2E, the transverse position control magnet 206e is illustrated as a single pole magnet. In other examples, the transverse position control magnet 206e may be a dual pole magnet. In some embodiments, the actuator 200e may include one or more magnetic field sensors 208e (e.g., a Hall sensor, a TMR sensor, and/or a GMR sensor) for determining a position of the position sensor magnet 202e. In some embodiments, a lateral offset toward the transverse position control magnet 206e may be provided between the position sensor magnet 202e and the magnetic field sensor 208e.

Figure 2F:
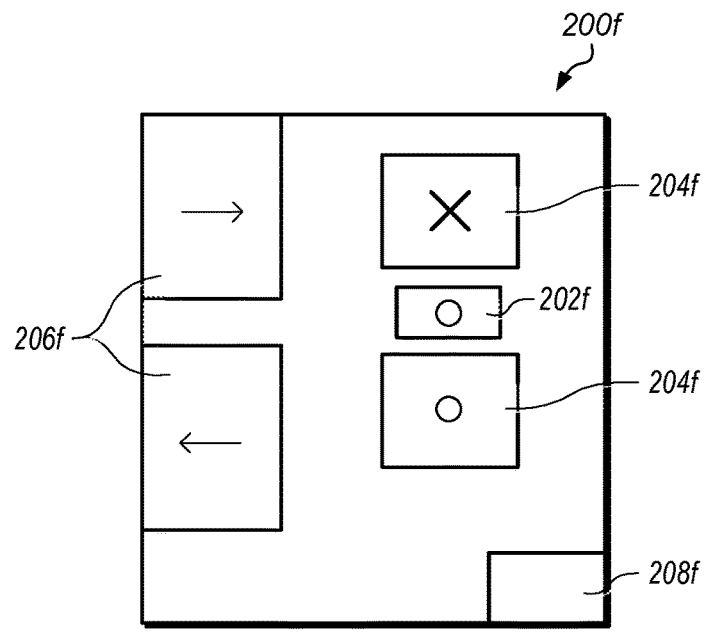
FIG. 2F illustrates a side view of an example embodiment of an actuator module or assembly that may, for example, be used to provide magnetic sensing for autofocus and/or optical image stabilization position detection in small form factor cameras, according to at least some embodiments.

FIG. 2F illustrates a side view of an example embodiment of an actuator 200f module or assembly that may, for example, be used to provide magnetic sensing for autofocus position detection in small form factor cameras, according to at least some embodiments. In some embodiments, the actuator 200f may include a plurality of position sensor magnets, for example position sensor magnet 202f mounted within an autofocus coil 204f. A transverse position control magnet 206f may be situated in the actuator 200f. In some embodiments, the actuator 200f may include one or more magnetic field sensors 208f (e.g., a Hall sensor, a TMR sensor, and/or a GMR sensor) for determining a position of the position sensor magnet 202f. In some embodiments, a lateral offset toward the optical package (not shown) may be provided between position sensor magnet 202f and the magnetic field sensor 208f.

Figure 2G:
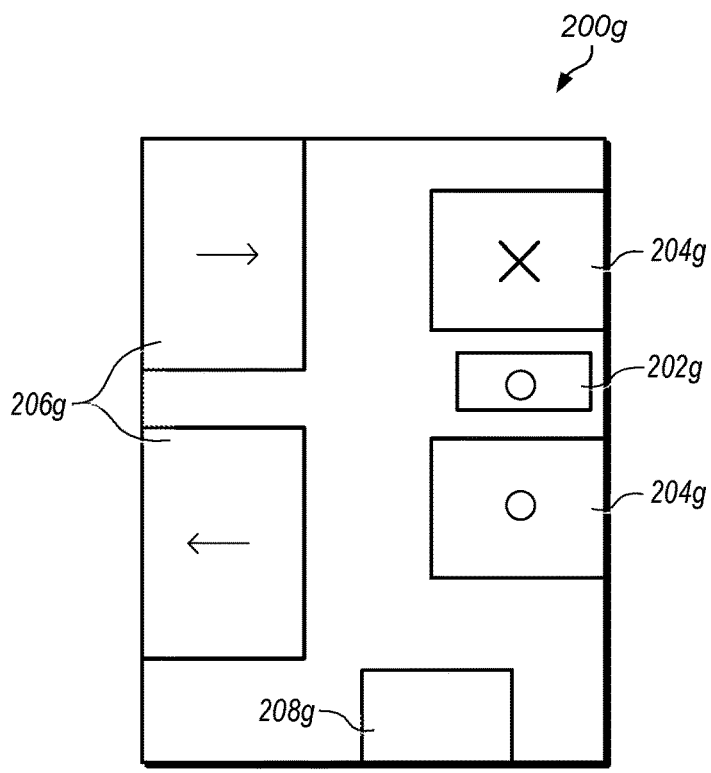
FIG. 2G depicts a side view of an example embodiment of an actuator module or assembly that may, for example, be used to provide magnetic sensing for autofocus and/or optical image stabilization position detection in small form factor cameras, according to at least some embodiments.

FIG. 2G depicts a side view of an example embodiment of an actuator 200g module or assembly that may, for example, be used to provide magnetic sensing for autofocus position detection in small form factor cameras, according to at least some embodiments. In some embodiments, the actuator 200g may include a plurality of position sensor magnets, for example position sensor magnet 202g mounted within an autofocus coil 204g. A transverse position control magnet 206g may be situated in the actuator 200g. In some embodiments, the actuator 200g may include one or more magnetic field sensors 208g (e.g., a Hall sensor, a TMR sensor, and/or a GMR sensor) for determining a position of the position sensor magnet 202g. In some embodiments, a lateral offset toward the transverse position control magnet 206g may be provided between position sensor magnet 202g and the magnetic field sensor 208g.

Figure 2H:
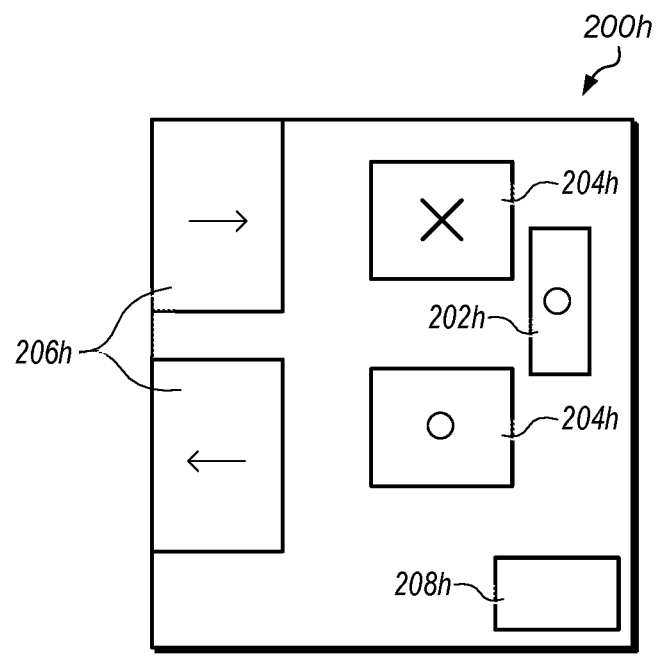
FIG. 2H illustrates a side view of an example embodiment of an actuator module or assembly that may, for example, be used to provide magnetic sensing for autofocus and/or optical image stabilization position detection in small form factor cameras, according to at least some embodiments.

FIG. 2H illustrates a side view of an example embodiment of an actuator 200h module or assembly that may, for example, be used to provide magnetic sensing for autofocus position detection in small form factor cameras, according to at least some embodiments. In some embodiments, the actuator 200h may include a plurality of position sensor magnets, for example position sensor magnet 202h mounted within an autofocus coil 204h and an optics package (not shown). A transverse position control magnet 206h may be situated in the actuator 200h. In some embodiments, the actuator 200h may include one or more magnetic field sensors 208h (e.g., a Hall sensor, a TMR sensor, and/or a GMR sensor) for determining a position of the position sensor magnets. In some embodiments, no lateral offset is provided between position sensor magnet 202*h* and the magnetic field sensor 208*h*.

Figure 2I:
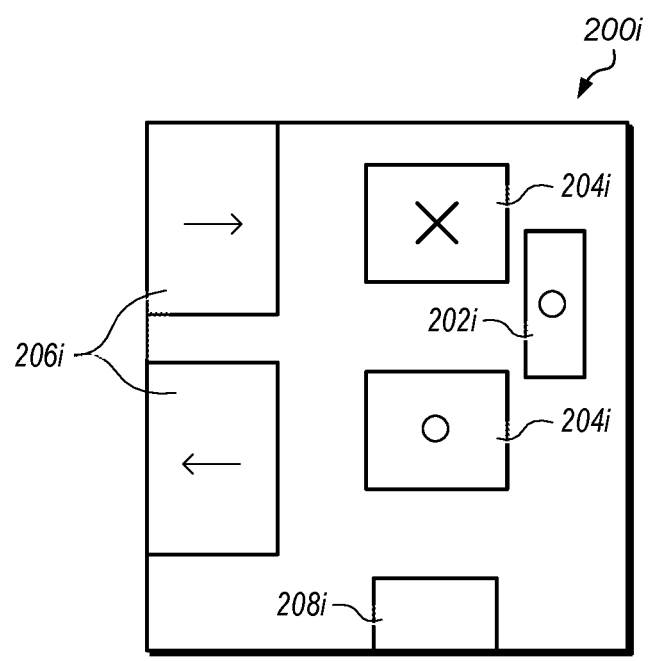
FIG. 2I depicts a side view of an example embodiment of an actuator module or assembly that may, for example, be used to provide magnetic sensing for autofocus and/or optical image stabilization position detection in small form factor cameras, according to at least some embodiments.

FIG. 2I depicts a side view of an example embodiment of an actuator 200*i* module or assembly that may, for example, be used to provide magnetic sensing for autofocus position detection in small form factor cameras, according to at least some embodiments. In some embodiments, an actuator 200*i* may include a plurality of position sensor magnets, for example position sensor magnet 202*i* mounted within an autofocus coil 204*i* and an optics package (not shown). A transverse position control magnet 206*i* may be situated in the actuator 200*i*. In some embodiments, the actuator 200*i* may include one or more magnetic field sensors 208*i* (e.g., a Hall sensor, a TMR sensor, and/or a GMR sensor) for determining a position of the position sensor magnets. In some embodiments, a lateral offset toward the transverse position control magnet 206*i* may be provided between position sensor magnet 202*i* and the magnetic field sensor 208*i*.

Figure 3:
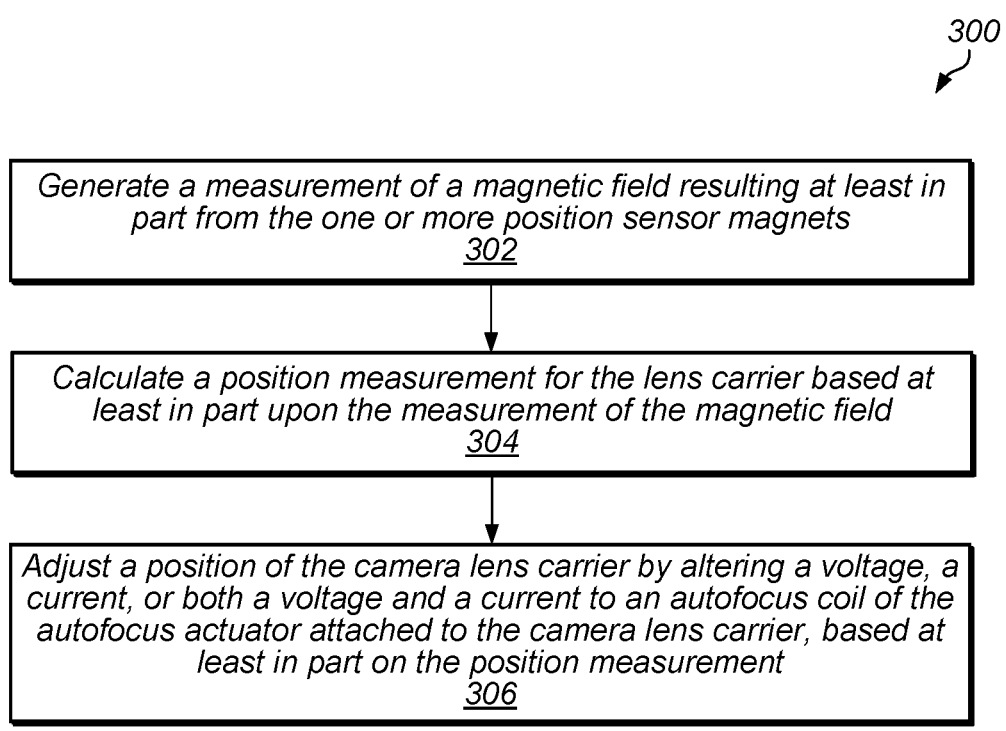
FIG. 3 is a flowchart of a method for magnetic sensing for autofocus position detection and control, according to at least some embodiments.

FIG. 3 is a flowchart of a method 300 for magnetic sensing for autofocus position detection and control, according to at least some embodiments. At 302, the method 300 may include generating a measurement of a magnetic field resulting at least in part from one or more position sensor magnets. The position sensor magnets may be part of a magnetic actuator. In some examples, the magnetic actuator may be configured to move an optical package of a camera unit. Generating the measurement of the magnetic field may include measuring one or more magnetic field components created at least in part by one or more position sensor magnets that are fixedly mounted to a camera lens carrier. The optical package may be disposed on the camera lens carrier. The camera lens carrier may be configured to move with respect to a base.

In some embodiments, one or more autofocus coils may be attached to the camera lens carrier. The autofocus coils may be configured to interact with one or more magnets of the magnetic actuator to provide autofocus functionality. For instance, a voltage and/or a current may be applied to the autofocus coils, thereby causing the autofocus coils to produce a first magnetic field that interacts with a second magnetic field produced by one or more magnets. The interaction between at least the first magnetic field and the second magnetic field may impose one or more forces on the autofocus coils that cause the autofocus coils to move along the Z axis and/or the optical axis. In some examples, the position sensor magnets may be nested within the autofocus coils.

The magnetic actuator may include one or more magnetic field sensors configured to measure one or more magnetic field components. For instance, the magnetic field sensors may include a Hall sensor, a TMR sensor, and/or a GMR sensor. In some embodiments, the magnetic field sensors may In some embodiments, or more optical image stabilization coils of the magnetic actuator may be disposed on, or proximate to, the base. The optical image stabilization coils may be configured to interact with one or more magnets to provide optical image stabilization functionality. For instance, a voltage and/or a current may be applied to the optical image stabilization coils, thereby causing the optical image stabilization coils to produce a first magnetic field that interacts with a second magnetic field produced by one or more magnets. The interaction between at least the first magnetic field and the second magnetic field may impose one or more forces on the optical image stabilization coils that cause the optical image stabilization coils to move along the x and/or y axes (e.g., along the x-y plane that is orthogonal to the Z axis).

At 304, the method 300 may include calculating a position measurement for the lens carrier based at least in part upon the measurement of the magnetic field. At 306, the method 300 may include adjusting a position of a camera lens carrier. For instance, the position of the camera lens carrier may be adjusted by altering a voltage and/or a current supplied to an autofocus coil of an autofocus actuator that is attached to the camera lens carrier. In some examples, the position of the camera lens carrier may be adjusted based at least in part on the position measurement.

Figure 4:
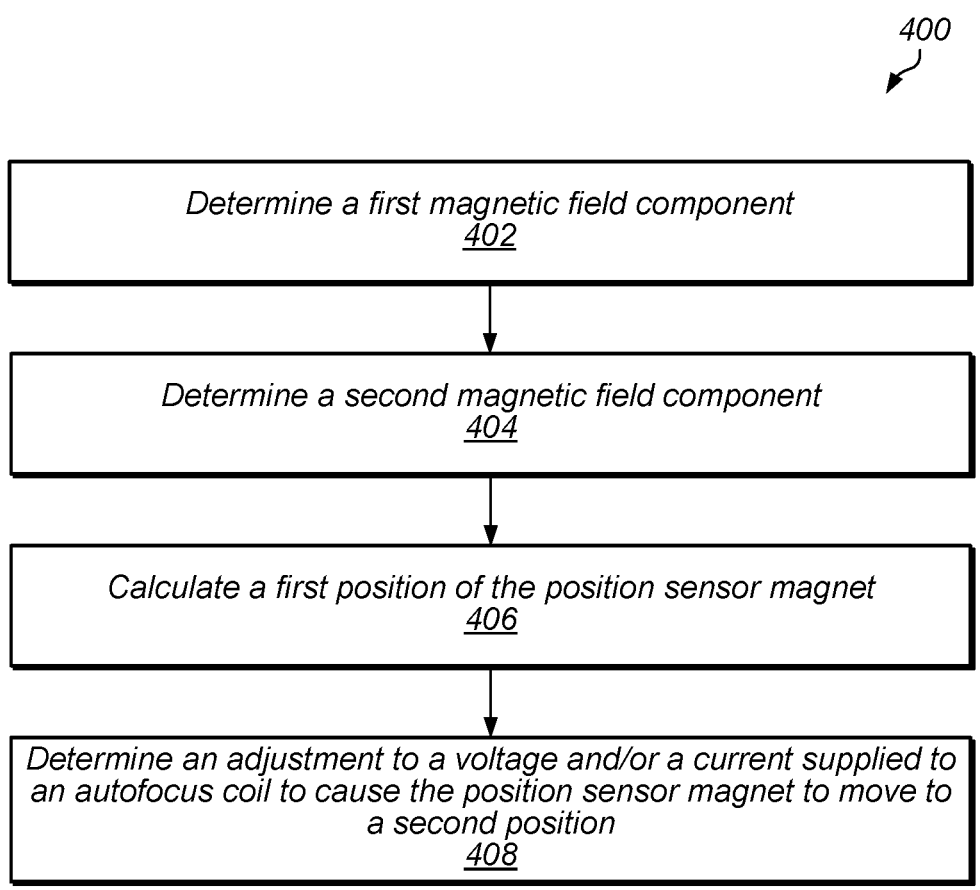
FIG. 4 is a flowchart of a method for magnetic sensing for autofocus position detection and control, according to at least some embodiments.

FIG. 4 is a flowchart of a method 400 for magnetic sensing for autofocus position detection and control, according to at least some embodiments. In some examples, a system may include an optical package and an actuator for moving the optical package. The actuator may include a lateral position control magnet and a pair of transverse position control magnets. The lateral position control magnet may be situated at a first side of the optical package. The pair of transverse position control magnets may be situated on respective second and third sides of the optical package opposite one another with respect to an axis between the optical package and the lateral position control magnet.

Furthermore, the actuator may include one or more position sensor magnets and one or more magnetic field sensors. The position sensor magnets may be attached to the optical package. The magnetic field sensors may be configured to measure one or more magnetic field components. For instance, at least one of the transverse position control magnets may contribute to a first magnetic field component corresponding to a first axis, and at least one of the position sensor magnets may contribute to a second magnetic field component corresponding to a second axis that is orthogonal to the first axis. In some embodiments, at least one of the magnetic field sensors may be configured to measure the first magnetic field component and the second magnetic field component.

At 402, the method 400 may include determining a first magnetic field component. For instance, the magnetic field sensors may be used to measure the first magnetic field component produced at least in part by a transverse position control magnet. At 404, the method 400 may include determining a second magnetic field component. For instance, the magnetic field sensors may be used to measure the second magnetic field component produced at least in part by a position sensor magnet.

At 406, the method 400 may include calculating a first position of the position sensor magnet. For instance, the first position of the position sensor magnet may be a position along an optical axis defined by one or more lenses of the optical package. In various embodiments, the calculation of the first position may be based at least in part on the first magnetic field component and the second magnetic field component. For instance, the first position may be calculated based at least in part on an angle between the first magnetic field component and the second magnetic field component. The angle between the first magnetic field component and the second magnetic field component may correlate with a position of the position sensor magnet. For instance, by simulating performance of the actuator, or by testing the actual actuator, multiple measurements may be obtained that may be used to characterize the behavior of the actuator with respect to the angle, between the first magnetic field component and the second magnetic field component, and position of the position sensor magnet along the optical axis. In some instances, the simulation and/or testing measurements may be used to characterize the behavior of the actuator to correlate changes in the angle with changes in the position. For instance, a particular change in the angle between the first magnetic field component and the second magnetic field component may be correlated with a particular autofocus stroke. In some embodiments, changes in the position of position sensor magnet along the X-Y plane may also be taken into consideration in characterizing the behavior of the actuator. Once the behavior of the actuator is characterized, the resulting correlations may be used as a map for determining the position of the position sensor magnet along the X, Y, and/or Z axes.

At 408, the method 400 may include determining an adjustment to a voltage and/or a current supplied to an autofocus coil to cause the position sensor magnet to move to a second position. For instance, the second position may be a position along the optical axis that is different than the first position. In various embodiments, determination of the adjustment to the voltage and/or the current supplied to the autofocus coil may be based at least in part on the first position of the position sensor magnet.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 5:
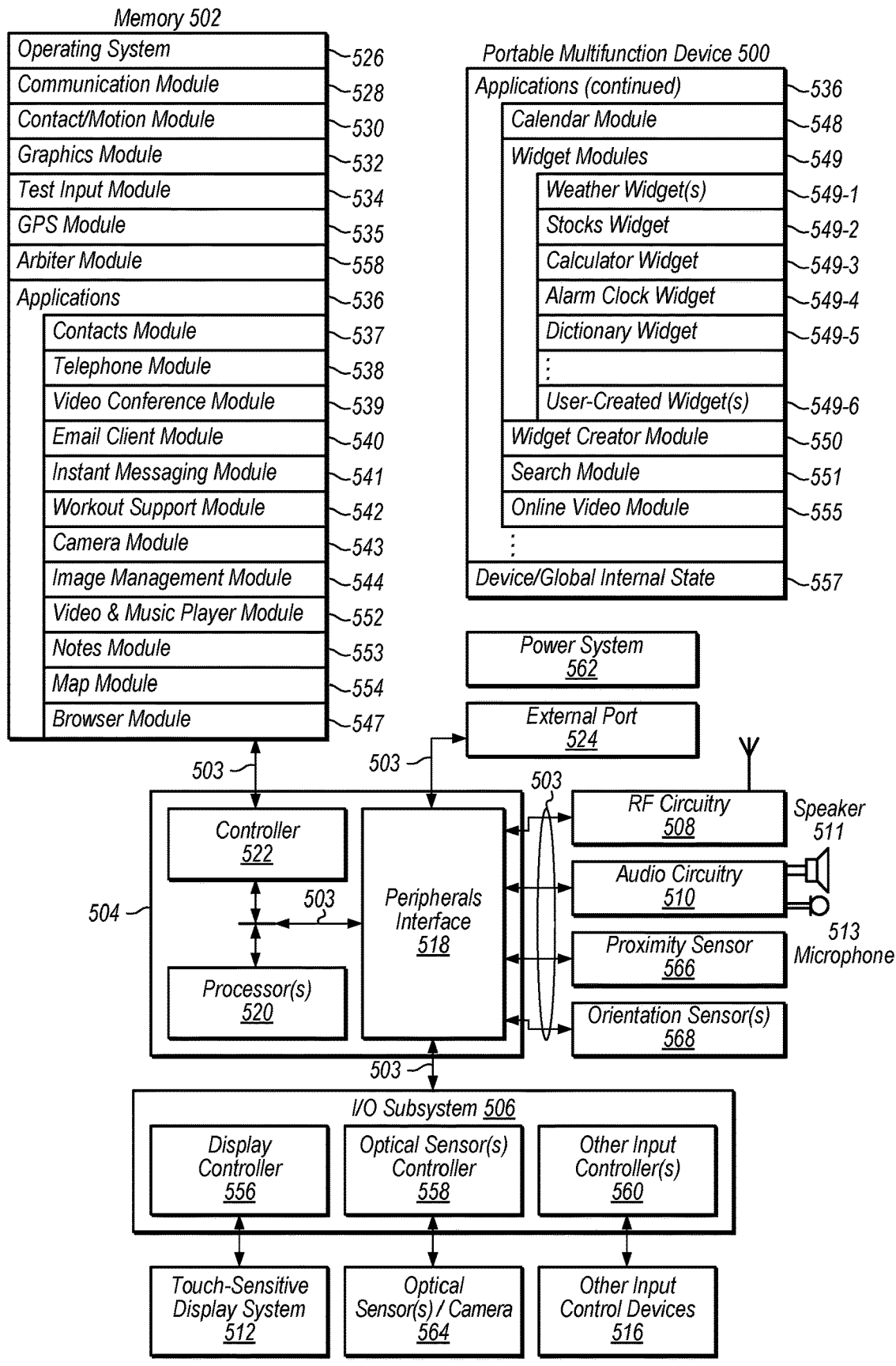
FIG. 5 illustrates a block diagram of a portable multifunction device with a camera that may include an actuator module in accordance with some embodiments.

Attention is now directed toward embodiments of portable devices with cameras. FIG. 5 is a block diagram illustrating portable multifunction device 500 with camera 564 in accordance with some embodiments. Camera 564 is sometimes called an "optical sensor" for convenience, and may also be known as or called an optical sensor system. Device 500 may include memory 502 (which may include one or more computer readable storage mediums), memory controller 522, one or more processing units (CPUs) 520, peripherals interface 518, RF circuitry 508, audio circuitry 510, speaker 511, touch-sensitive display system 512, microphone 513, input/output (I/O) subsystem 506, other input or control devices 516, and external port 524. Device 500 may include one or more optical sensors 564. These components may communicate over one or more communication buses or signal lines 503.

It should be appreciated that device 500 is only one example of a portable multifunction device, and that device 500 may have more or fewer components than shown, may combine two or more components, or may have a different configuration or arrangement of the components. The various components shown in FIG. 5 may be implemented in hardware, software, or a combination of hardware and software, including one or more signal processing and/or application specific integrated circuits.

Memory 502 may include high-speed random access memory and may also include non-volatile memory, such as one or more magnetic disk storage devices, flash memory devices, or other non-volatile solid-state memory devices. Access to memory 502 by other components of device 500, such as CPU 520 and the peripherals interface 518, may be controlled by memory controller 522.

Peripherals interface 518 can be used to couple input and output peripherals of the device to CPU 520 and memory 502. The one or more processors 520 run or execute various software programs and/or sets of instructions stored in memory 502 to perform various functions for device 500 and to process data.

In some embodiments, peripherals interface 518, CPU 520, and memory controller 522 may be implemented on a single chip, such as chip 504. In some other embodiments, they may be implemented on separate chips.

RF (radio frequency) circuitry 508 receives and sends RF signals, also called electromagnetic signals. RF circuitry 508 converts electrical signals to/from electromagnetic signals and communicates with communications networks and other communications devices via the electromagnetic signals. RF circuitry 508 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 508 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 510, speaker 511, and microphone 513 provide an audio interface between a user and device 500. Audio circuitry 510 receives audio data from peripherals interface 518, converts the audio data to an electrical signal, and transmits the electrical signal to speaker 511. Speaker 511 converts the electrical signal to human-audible sound waves. Audio circuitry 510 also receives electrical signals converted by microphone 513 from sound waves. Audio circuitry 510 converts the electrical signal to audio data and transmits the audio data to peripherals interface 518 for processing. Audio data may be retrieved from and/or transmitted to memory 502 and/or RF circuitry 508 by peripherals interface 518. In some embodiments, audio circuitry 510 also includes a headset jack (e.g., 612, FIG. 6). The headset jack provides an interface between audio circuitry 510 and removable audio input/output peripherals, such as output-only headphones or a headset with both output (e.g., a headphone for one or both ears) and input (e.g., a microphone).

I/O subsystem 506 couples input/output peripherals on device 500, such as touch screen 512 and other input control devices 516, to peripherals interface 518. I/O subsystem 506 may include display controller 556 and one or more input controllers 560 for other input or control devices. The one or more input controllers 560 receive/send electrical signals from/to other input or control devices 516. The other input control devices 516 may include physical buttons (e.g., push buttons, rocker buttons, etc.), dials, slider switches, joysticks, click wheels, and so forth. In some alternate embodiments, input controller(s) 560 may be coupled to any (or none) of the following: a keyboard, infrared port, USB port, and a pointer device such as a mouse. The one or more buttons (e.g., 608, FIG. 6) may include an up/down button for volume control of speaker 511 and/or microphone 513. The one or more buttons may include a push button (e.g., 606, FIG. 6).

Touch-sensitive display 512 provides an input interface and an output interface between the device and a user. Display controller 556 receives and/or sends electrical signals from/to touch screen 512. Touch screen 512 displays visual output to the user. The visual output may include graphics, text, icons, video, and any combination thereof (collectively termed "graphics"). In some embodiments, some or all of the visual output may correspond to user-interface objects.

Touch screen 512 has a touch-sensitive surface, sensor or set of sensors that accepts input from the user based on haptic and/or tactile contact. Touch screen 512 and display controller 556 (along with any associated modules and/or sets of instructions in memory 502) detect contact (and any movement or breaking of the contact) on touch screen 512 and converts the detected contact into interaction with user-interface objects (e.g., one or more soft keys, icons, web pages or images) that are displayed on touch screen 512. In an example embodiment, a point of contact between touch screen 512 and the user corresponds to a finger of the user.

Touch screen 512 may use LCD (liquid crystal display) technology, LPD (light emitting polymer display) technology, or LED (light emitting diode) technology, although other display technologies may be used in other embodiments. Touch screen 512 and display controller 556 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 512. In an example embodiment, projected mutual capacitance sensing technology is used, such as that found in the iPhone®, iPod Touch®, and iPad® from Apple Inc. of Cupertino, Calif.

Touch screen 512 may have a video resolution in excess of 500 dpi. In some embodiments, the touch screen has a video resolution of approximately 560 dpi. The user may make contact with touch screen 512 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 500 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 512 or an extension of the touch-sensitive surface formed by the touch screen.

Device 500 also includes power system 562 for powering the various components. Power system 562 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 500 may also include one or more optical sensors or cameras 564. FIG. 5 shows an optical sensor 564 coupled to optical sensor controller 558 in I/O subsystem 506. Optical sensor 564 may include charge-coupled device (CCD) or complementary metal-oxide semiconductor (CMOS) phototransistors. Optical sensor 564 receives light from the environment, projected through one or more lens, and converts the light to data representing an image. In conjunction with imaging module 543 (also called a camera module), optical sensor 564 may capture still images or video. In some embodiments, an optical sensor 564 is located on the back of device 500, opposite touch screen display 512 on the front of the device, so that the touch screen display 512 may be used as a viewfinder for still and/or video image acquisition. In some embodiments, another optical sensor is located on the front of the device so that the user's image may be obtained for videoconferencing while the user views the other video conference participants on the touch screen display.

Device 500 may also include one or more proximity sensors 566. FIG. 5 shows proximity sensor 566 coupled to peripherals interface 518. Alternately, proximity sensor 566 may be coupled to input controller 560 in I/O subsystem 506. In some embodiments, the proximity sensor 566 turns off and disables touch screen 512 when the multifunction device 500 is placed near the user's ear (e.g., when the user is making a phone call).

Device 500 includes one or more orientation sensors 568. In some embodiments, the one or more orientation sensors 568 include one or more accelerometers (e.g., one or more linear accelerometers and/or one or more rotational accelerometers). In some embodiments, the one or more orientation sensors 568 include one or more gyroscopes. In some embodiments, the one or more orientation sensors 568 include one or more magnetometers. In some embodiments, the one or more orientation sensors 568 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 500. In some embodiments, the one or more orientation sensors 568 include any combination of orientation/rotation sensors. FIG. 5 shows the one or more orientation sensors 568 coupled to peripherals interface 518. Alternately, the one or more orientation sensors 568 may be coupled to an input controller 560 in I/O subsystem 506. In some embodiments, information is displayed on the touch screen display 512 in a portrait view or a landscape view based on an analysis of data received from the one or more orientation sensors 568.

In some embodiments, the software components stored in memory 502 include operating system 526, communication module (or set of instructions) 528, contact/motion module (or set of instructions) 530, graphics module (or set of instructions) 532, text input module (or set of instructions) 534, Global Positioning System (GPS) module (or set of instructions) 535, arbiter module 558 and applications (or sets of instructions) 536. Furthermore, in some embodiments memory 502 stores device/global internal state 557. Device/global internal state 557 includes one or more of: active application state, indicating which applications, if any, are currently active; display state, indicating what applications, views or other information occupy various regions of touch screen display 512; sensor state, including information obtained from the device's various sensors and input control devices 516; and location information concerning the device's location and/or attitude.

Operating system 526 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 528 facilitates communication with other devices over one or more external ports 524 and also includes various software components for handling data received by RF circuitry 508 and/or external port 524. External port 524 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 530 may detect contact with touch screen 512 (in conjunction with display controller 556) and other touch sensitive devices (e.g., a touchpad or physical click wheel). Contact/motion module 530 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 530 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 530 and display controller 556 detect contact on a touchpad.

Contact/motion module 530 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 532 includes various known software components for rendering and displaying graphics on touch screen 512 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 532 stores data representing graphics to be used. Each graphic may be assigned a corresponding code. Graphics module 532 receives, from applications etc., one or more codes specifying graphics to be displayed along with, if necessary, coordinate data and other graphic property data, and then generates screen image data to output to display controller 556.

Text input module 534, which may be a component of graphics module 532, provides soft keyboards for entering text in various applications (e.g., contacts 537, e-mail 540, IM 541, browser 547, and any other application that needs text input).

GPS module 535 determines the location of the device and provides this information for use in various applications (e.g., to telephone 538 for use in location-based dialing, to camera 543 as picture/video metadata, and to applications that provide location-based services such as weather widgets, local yellow page widgets, and map/navigation widgets).

Applications 536 may include the following modules (or sets of instructions), or a subset or superset thereof:
  contacts module 537 (sometimes called an address book or contact list);
  telephone module 538;

video conferencing module 539;
e-mail client module 540;
instant messaging (IM) module 541;
workout support module 542;
camera module 543 for still and/or video images;
image management module 544;
browser module 547;
calendar module 548;
widget modules 549, which may include one or more of: weather widget 549-1, stocks widget 549-2, calculator widget 549-3, alarm clock widget 549-4, dictionary widget 549-5, and other widgets obtained by the user, as well as user-created widgets 549-6;
widget creator module 550 for making user-created widgets 549-6;
search module 551;
video and music player module 552, which may be made up of a video player module and a music player module;
notes module 553;
map module 554; and/or
online video module 555.

Examples of other applications 536 that may be stored in memory 502 include other word processing applications, other image editing applications, drawing applications, presentation applications, JAVA-enabled applications, encryption, digital rights management, voice recognition, and voice replication.

In conjunction with touch screen 512, display controller 556, contact module 530, graphics module 532, and text input module 534, contacts module 537 may be used to manage an address book or contact list (e.g., stored in application internal state 557), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 538, video conference 539, e-mail 540, or IM 541; and so forth.

In conjunction with RF circuitry 508, audio circuitry 510, speaker 511, microphone 513, touch screen 512, display controller 556, contact module 530, graphics module 532, and text input module 534, telephone module 538 may be used to enter a sequence of characters corresponding to a telephone number, access one or more telephone numbers in address book 537, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 508, audio circuitry 510, speaker 511, microphone 513, touch screen 512, display controller 556, optical sensor 564, optical sensor controller 558, contact module 530, graphics module 532, text input module 534, contact list 537, and telephone module 538, videoconferencing module 539 includes executable instructions to initiate, conduct, and terminate a video conference between a user and one or more other participants in accordance with user instructions.

In conjunction with RF circuitry 508, touch screen 512, display controller 556, contact module 530, graphics module 532, and text input module 534, e-mail client module 540 includes executable instructions to create, send, receive, and manage e-mail in response to user instructions. In conjunction with image management module 544, e-mail client module 540 makes it very easy to create and send e-mails with still or video images taken with camera module 543.

In conjunction with RF circuitry 508, touch screen 512, display controller 556, contact module 530, graphics module 532, and text input module 534, the instant messaging module 541 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 508, touch screen 512, display controller 556, contact module 530, graphics module 532, text input module 534, GPS module 535, map module 554, and music player module 546, workout support module 542 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 512, display controller 556, optical sensor(s) 564, optical sensor controller 558, contact module 530, graphics module 532, and image management module 544, camera module 543 includes executable instructions to capture still images or video (including a video stream) and store them into memory 502, modify characteristics of a still image or video, or delete a still image or video from memory 502.

In conjunction with touch screen 512, display controller 556, contact module 530, graphics module 532, text input module 534, and camera module 543, image management module 544 includes executable instructions to arrange, modify (e.g., edit), or otherwise manipulate, label, delete, present (e.g., in a digital slide show or album), and store still and/or video images.

In conjunction with RF circuitry 508, touch screen 512, display system controller 556, contact module 530, graphics module 532, and text input module 534, browser module 547 includes executable instructions to browse the Internet in accordance with user instructions, including searching, linking to, receiving, and displaying web pages or portions thereof, as well as attachments and other files linked to web pages.

In conjunction with RF circuitry 508, touch screen 512, display system controller 556, contact module 530, graphics module 532, text input module 534, e-mail client module 540, and browser module 547, calendar module 548 includes executable instructions to create, display, modify, and store calendars and data associated with calendars (e.g., calendar entries, to do lists, etc.) in accordance with user instructions.

In conjunction with RF circuitry 508, touch screen 512, display system controller 556, contact module 530, graphics module 532, text input module 534, and browser module 547, widget modules 549 are mini-applications that may be downloaded and used by a user (e.g., weather widget 549-1, stocks widget 549-2, calculator widget 5493, alarm clock widget 549-4, and dictionary widget 549-5) or created by the user (e.g., user-created widget 549-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 508, touch screen 512, display system controller 556, contact module 530, graphics module 532, text input module 534, and browser module 547, the widget creator module 550 may be used by a user to create widgets (e.g., turning a user-specified portion of a web page into a widget).

In conjunction with touch screen 512, display system controller 556, contact module 530, graphics module 532, and text input module 534, search module 551 includes executable instructions to search for text, music, sound, image, video, and/or other files in memory 502 that match one or more search criteria (e.g., one or more user-specified search terms) in accordance with user instructions.

In conjunction with touch screen 512, display system controller 556, contact module 530, graphics module 532, audio circuitry 510, speaker 511, RF circuitry 508, and browser module 547, video and music player module 552 includes executable instructions that allow the user to download and play back recorded music and other sound files stored in one or more file formats, such as MP3 or AAC files, and executable instructions to display, present or otherwise play back videos (e.g., on touch screen 512 or on an external, connected display via external port 524). In some embodiments, device 500 may include the functionality of an MP3 player.

In conjunction with touch screen 512, display controller 556, contact module 530, graphics module 532, and text input module 534, notes module 553 includes executable instructions to create and manage notes, to do lists, and the like in accordance with user instructions.

In conjunction with RF circuitry 508, touch screen 512, display system controller 556, contact module 530, graphics module 532, text input module 534, GPS module 535, and browser module 547, map module 554 may be used to receive, display, modify, and store maps and data associated with maps (e.g., driving directions; data on stores and other points of interest at or near a particular location; and other location-based data) in accordance with user instructions.

In conjunction with touch screen 512, display system controller 556, contact module 530, graphics module 532, audio circuitry 510, speaker 511, RF circuitry 508, text input module 534, e-mail client module 540, and browser module 547, online video module 555 includes instructions that allow the user to access, browse, receive (e.g., by streaming and/or download), play back (e.g., on the touch screen or on an external, connected display via external port 524), send an e-mail with a link to a particular online video, and otherwise manage online videos in one or more file formats, such as H.264. In some embodiments, instant messaging module 541, rather than e-mail client module 540, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 502 may store a subset of the modules and data structures identified above. Furthermore, memory 502 may store additional modules and data structures not described above.

In some embodiments, device 500 is a device where operation of a predefined set of functions on the device is performed exclusively through a touch screen and/or a touchpad. By using a touch screen and/or a touchpad as the primary input control device for operation of device 500, the number of physical input control devices (such as push buttons, dials, and the like) on device 500 may be reduced.

The predefined set of functions that may be performed exclusively through a touch screen and/or a touchpad include navigation between user interfaces. In some embodiments, the touchpad, when touched by the user, navigates device 500 to a main, home, or root menu from any user interface that may be displayed on device 500. In such embodiments, the touchpad may be referred to as a "menu button." In some other embodiments, the menu button may be a physical push button or other physical input control device instead of a touchpad.

Figure 6:
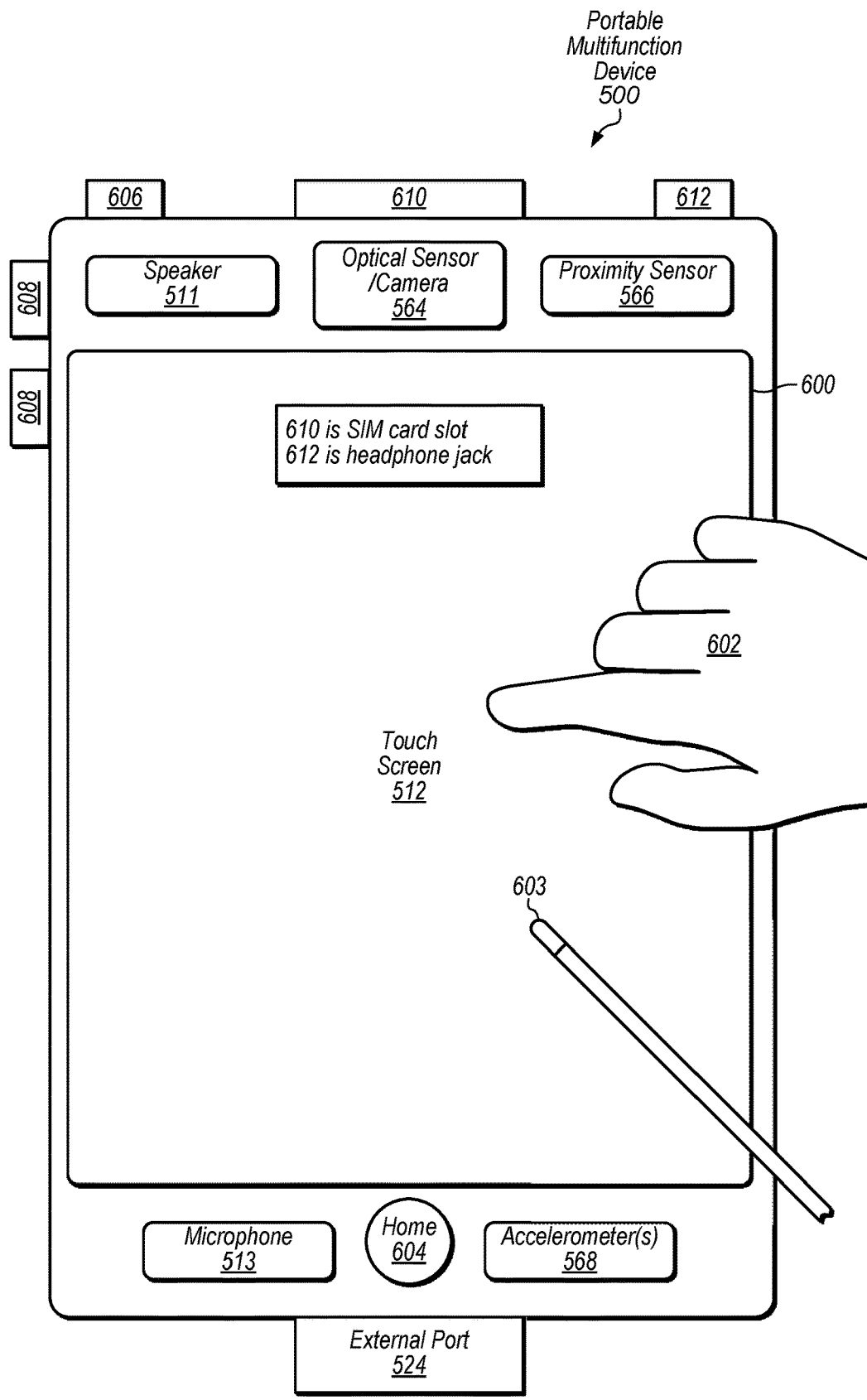
FIG. 6 depicts a portable multifunction device having a camera that may include an actuator module in accordance with some embodiments.

FIG. 6 illustrates a portable multifunction device 500 having a touch screen 512 in accordance with some embodiments. The touch screen 512 may display one or more graphics within user interface (UI) 600. In this embodiment, as well as others described below, a user may select one or more of the graphics by making a gesture on the graphics, for example, with one or more fingers 602 (not drawn to scale in the figure) or one or more styluses 603 (not drawn to scale in the figure).

Device 500 may also include one or more physical buttons, such as "home" or menu button 604. As described previously, menu button 604 may be used to navigate to any application 536 in a set of applications that may be executed on device 500. Alternatively, in some embodiments, the menu button 604 is implemented as a soft key in a GUI displayed on touch screen 512.

In one embodiment, device 500 includes touch screen 512, menu button 604, push button 606 for powering the device on/off and locking the device, volume adjustment button(s) 608, Subscriber Identity Module (SIM) card slot 610, head set jack 612, and docking/charging external port 524. Push button 606 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 500 also may accept verbal input for activation or deactivation of some functions through microphone 513.

It should be noted that, although many of the examples herein are given with reference to optical sensor/camera 564 (on the front of a device), a rear-facing camera or optical sensor that is pointed opposite from the display may be used instead of or in addition to an optical sensor/camera 564 on the front of a device.

Example Computer System

Figure 7:
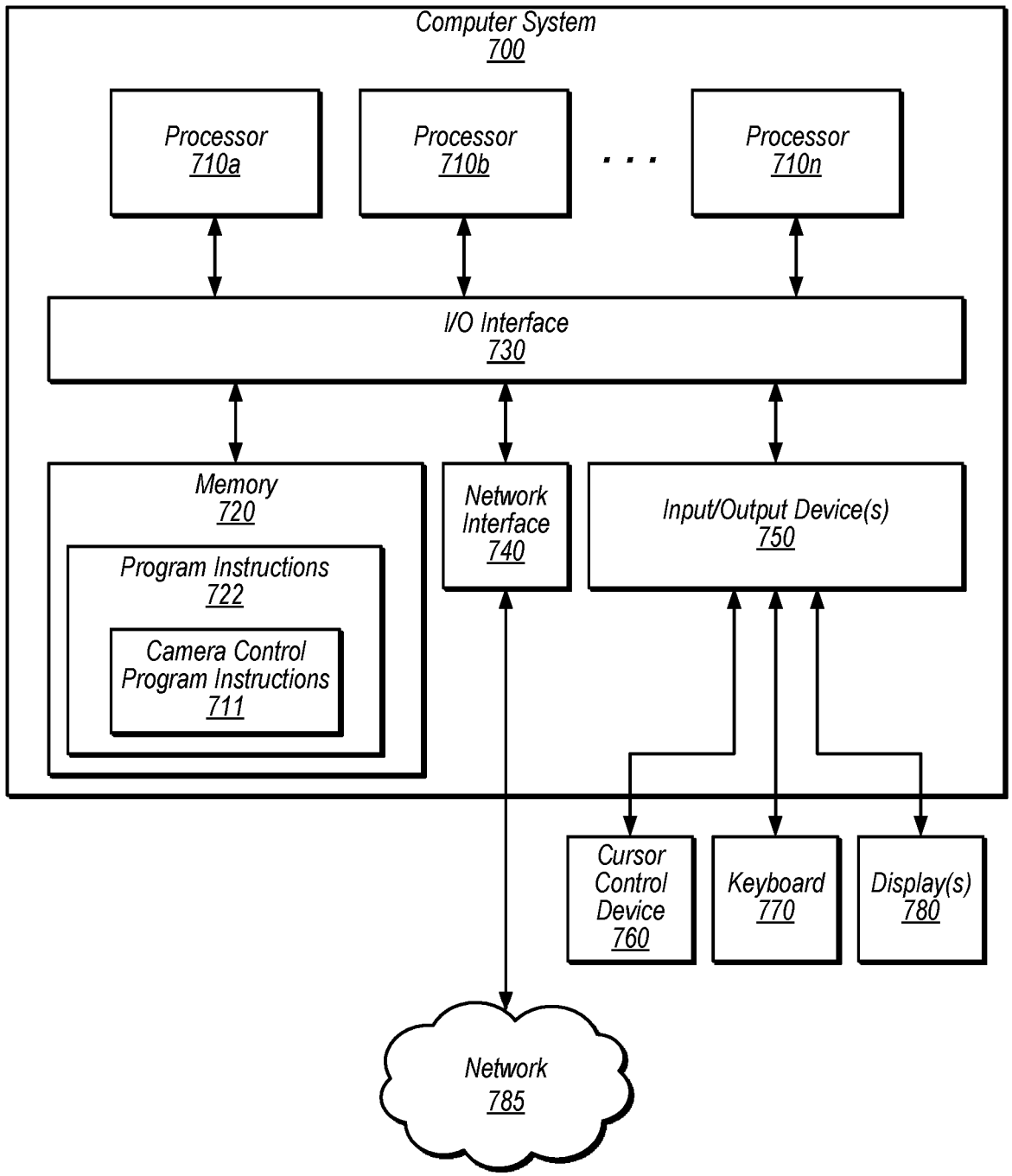
FIG. 7 illustrates an example computer system configured to implement aspects of magnetic sensing for autofocus and/or optical image stabilization position detection and control, according to some embodiments.

FIG. 7 illustrates an example computer system 700 that may be configured to execute any or all of the embodiments described above. In different embodiments, computer system 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 700, which may interact with various other devices. Note that any component, action, or functionality described above with respect to FIGS. 1-6 may be implemented on one or more computers configured as computer system 700 of FIG. 7, according to various embodiments. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store camera control program instructions 722 and/or camera control data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions 722 may be configured to implement a lens control application 724 incorporating any of the functionality described above. Additionally, existing camera control data 732 of memory 720 may include any of the information or data structures described above. In some embodiments, program instructions and/or data may be received, sent or stored upon different types of computer-accessible media or on similar media separate from system memory 720 or computer system 700. While computer system 700 is described as implementing the functionality of functional blocks of previous Figures, any of the functionality described herein may be implemented via such a computer system.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network 785 (e.g., carrier or agent devices) or between nodes of computer system 700. Network 785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 722, which may be processor-executable to implement any element or action described above. In one embodiment, the program instructions may implement the methods described above. In other embodiments, different elements and data may be included. Note that data may include any data or information described above.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera unit, comprising:
    an optical package including one or more lenses that define an optical axis;
    an asymmetric magnet arrangement for actuation along the optical axis and along a plane that is orthogonal to the optical axis, wherein the asymmetric magnet arrangement includes:
        a lateral position control magnet situated at a first side of the optical package; and
        a pair of transverse position control magnets situated on respective second and third sides of the optical package opposite one another with respect to an axis between the optical package and the lateral position control magnet, wherein the pair of transverse position control magnets contribute to actuation of the optical package in a direction parallel to the optical axis;
    one or more position sensor magnets attached to the optical package for movement relative to the pair of transverse position control magnets and in the direction parallel to the optical axis; and
    one or more magnetic field sensors configured to measure one or more magnetic field components to enable determination of a position, along the optical axis, of at least one of the one or more position sensor magnets.

2. The camera unit of claim 1, further comprising:
    at least one autofocus coil attached to the optical package; and
    optical image stabilization coils attached to a base of the camera unit;
    wherein the at least one autofocus coil is configured to move, relative to the base, in the direction parallel to the optical axis.

3. The camera unit of claim 2, wherein:
    the one or more position sensor magnets comprise a position sensor magnet disposed within a space that is encircled by the at least one autofocus coil.

4. The camera unit of claim 3, further comprising:
    a support structure that supports the position sensor magnet within the space encircled by the at least one autofocus coil such that the position sensor magnet moves together with the autofocus coil.

5. The camera unit of claim 2, wherein the optical image stabilization coils comprise:
    a first optical image stabilization coil proximate the lateral position control magnet;
    a second optical image stabilization coil proximate a first transverse position control magnet of the pair of transverse position control magnets; and
    a third optical image stabilization coil proximate a second transverse position control magnet of the pair of transverse position control magnets;
    wherein each of the optical image stabilization coils is configured to receive a flow of current that interacts with one or more magnetic fields produced by at least a portion of the asymmetric magnet arrangement such that the optical package moves for optical image stabilization.

6. The camera unit of claim 1, wherein:
    at least one transverse position control magnet of the pair of transverse position control magnets contributes to a first magnetic field component corresponding to a first axis;
    at least one position sensor magnet of the one or more position sensor magnets contributes to a second magnetic field component corresponding to a second axis that is orthogonal to the first axis; and
    at least one magnetic field sensor of the one or more magnetic field sensors is configured to measure the first magnetic field component and the second magnetic field component for determination of an angle between the first magnetic field component and the second magnetic field component.

7. An actuator module for moving an optical package, comprising:
    an asymmetric magnet arrangement for actuation along an optical axis of the optical package and along a plane that is orthogonal to the optical axis, wherein the asymmetric magnet arrangement includes:
        a lateral position control magnet situated at a first side of the optical package; and a pair of transverse position control magnets situated on respective second and third sides of the optical package opposite one another with respect to an axis between the optical package and the lateral position control magnet, wherein the pair of transverse position control magnets contribute to actuation of the optical package in a direction parallel to the optical axis;

one or more position sensor magnets attached to the optical package for movement relative to the pair of transverse position control magnets and in the direction parallel to the optical axis; and one or more magnetic field sensors configured to measure one or more magnetic field components to enable determination of a position, along the optical axis, of at least one of the one or more position sensor magnets.

8. The actuator module of claim 7, further comprising:
at least one autofocus coil configured to be attached to the optical package; and
optical image stabilization coils configured to be attached to a base of a camera;
wherein the at least one autofocus coil is configured to move, relative to the base, in the direction parallel to the optical axis.

9. The actuator module of claim 8, wherein:
the at least one autofocus coil comprises:
a first autofocus coil disposed proximate a first transverse position control magnet of the pair of transverse position control magnets; and
a second autofocus coil disposed proximate a second transverse position control magnet of the pair of transverse position control magnets; and
the one or more position sensor magnets comprise:
a first position sensor magnet attached to the first autofocus coil; and
a second position sensor magnet attached to the second autofocus coil.

10. The actuator module of claim 8, wherein the optical image stabilization coils comprise:
a first optical image stabilization coil proximate the lateral position control magnet;
a second optical image stabilization coil proximate a first transverse position control magnet of the pair of transverse position control magnets; and
a third optical image stabilization coil proximate a second transverse position control magnet of the pair of transverse position control magnets;
wherein each of the optical image stabilization coils is configured to receive a flow of current that interacts with one or more magnetic fields produced by at least a portion of the asymmetric magnet arrangement such that the optical package moves for optical image stabilization.

11. The actuator module of claim 7, wherein:
at least one transverse position control magnet of the pair of transverse position control magnets contributes to a first magnetic field component corresponding to a first axis;
at least one position sensor magnet of the one or more position sensor magnets contributes to a second magnetic field component corresponding to a second axis that is orthogonal to the first axis; and
at least one magnetic field sensor of the one or more magnetic field sensors is configured to measure the first magnetic field component and the second magnetic field component for determination of an angle between the first magnetic field component and the second magnetic field component.

12. The actuator module of claim 7, wherein the one or more position sensor magnets comprise:
a first position sensor magnet oriented with a first magnetic field in a first direction; and
a second position sensor magnet oriented with a second magnetic field in a second direction that is antiparallel to the first direction.

13. The actuator module of claim 7, wherein the one or more magnetic field sensors comprise:
a first magnetic field sensor disposed proximate the second side of the optical package; and
a second magnetic field sensor disposed proximate the third side of the optical package.

14. A device, comprising:
one or more processors;
memory storing program instructions executable by the one or more processors to control operation of a camera; and
the camera, comprising:
an optical package including one or more lenses that define an optical axis;
an asymmetric magnet arrangement for actuation along the optical axis and along a plane that is orthogonal to the optical axis, wherein the asymmetric magnet arrangement includes:
a lateral position control magnet situated at a first side of the optical package; and
a pair of transverse position control magnets situated on respective second and third sides of the optical package opposite one another with respect to an axis between the optical package and the lateral position control magnet, wherein the pair of transverse position control magnets contribute to actuation of the optical package in a direction parallel to the optical axis;
one or more position sensor magnets attached to the optical package for movement relative to the pair of transverse position control magnets and in the direction parallel to the optical axis; and
one or more magnetic field sensors configured to measure one or more magnetic field components to enable determination of a position, along the optical axis, of at least one of the one or more position sensor magnets.

15. The device of claim 14, further comprising:
at least one autofocus coil attached to the optical package; and
optical image stabilization coils attached to a base of the camera;
wherein the at least one autofocus coil is configured to move, relative to the base, in the direction parallel to the optical axis.

16. The device of claim 15, wherein:
the at least one autofocus coil comprises:
a first autofocus coil disposed proximate a first transverse position control magnet of the pair of transverse position control magnets; and
a second autofocus coil disposed proximate a second transverse position control magnet of the pair of transverse position control magnets; and
the one or more position sensor magnets comprise:
a first position sensor magnet attached to the first autofocus coil; and a second position sensor magnet attached to the second autofocus coil.

17. The device of claim 15, wherein the optical image stabilization coils comprise:
   a first optical image stabilization coil proximate the lateral position control magnet;
   a second optical image stabilization coil proximate a first transverse position control magnet of the pair of transverse position control magnets; and
   a third optical image stabilization coil proximate a second transverse position control magnet of the pair of transverse position control magnets;
   wherein each of the optical image stabilization coils is configured to receive a flow of current that interacts with one or more magnetic fields produced by at least a portion of the asymmetric magnet arrangement such that the optical package moves for optical image stabilization.

18. The device of claim 14, wherein:
   at least one transverse position control magnet of the pair of transverse position control magnets contributes to a first magnetic field component corresponding to a first axis;
   at least one position sensor magnet of the one or more position sensor magnets contributes to a second magnetic field component corresponding to a second axis that is orthogonal to the first axis; and
   at least one magnetic field sensor of the one or more magnetic field sensors is configured to measure the first magnetic field component and the second magnetic field component for determination of an angle between the first magnetic field component and the second magnetic field component.

19. The device of claim 14, wherein the one or more position sensor magnets comprise:
   a first position sensor magnet oriented with a first magnetic field in a first direction; and
   a second position sensor magnet oriented with a second magnetic field in a second direction that is antiparallel to the first direction.

20. The device of claim 14, wherein the one or more magnetic field sensors comprise:
   a first magnetic field sensor disposed proximate the second side of the optical package; and
   a second magnetic field sensor disposed proximate the third side of the optical package.

* * * * *